(12) United States Patent
Yamagami

(10) Patent No.: US 11,012,612 B2
(45) Date of Patent: May 18, 2021

(54) IMAGE INSPECTION SYSTEM AND IMAGE INSPECTION METHOD

(71) Applicant: Keyence Corporation, Osaka (JP)

(72) Inventor: Tsuyoshi Yamagami, Osaka (JP)

(73) Assignee: KEYENCE CORPORATION, Osaka (JP)

(*) Notice: Subject to any disclaimer, the term of this patent is extended or adjusted under 35 U.S.C. 154(b) by 0 days.

(21) Appl. No.: 16/797,135

(22) Filed: Feb. 21, 2020

(65) Prior Publication Data

US 2020/0322525 A1    Oct. 8, 2020

(30) Foreign Application Priority Data

Apr. 5, 2019   (JP) .............................. JP2019-072974

(51) Int. Cl.
    *H04N 5/232*    (2006.01)
    *G06T 7/586*    (2017.01)

(52) U.S. Cl.
    CPC ......... *H04N 5/23216* (2013.01); *G06T 7/586* (2017.01); *H04N 5/23206* (2013.01); *H04N 5/23229* (2013.01); *G06T 2207/10152* (2013.01); *G06T 2207/20221* (2013.01)

(58) Field of Classification Search
    CPC .......... H04N 5/23216; H04N 5/23206; H04N 5/23229; G06T 7/586; G06T 2207/20221; G06T 2207/10152
    USPC ........................................................ 348/131
    See application file for complete search history.

(56) References Cited

U.S. PATENT DOCUMENTS

| | | | |
|---|---|---|---|
| 7,433,025 B2 * | 10/2008 | Greenway | B01D 9/00 356/30 |
| 2005/0117144 A1 * | 6/2005 | Greenway | G02B 21/125 356/30 |
| 2014/0188435 A1 * | 7/2014 | Coombs | G01B 15/00 702/188 |
| 2015/0092062 A1 * | 4/2015 | Wang | H04N 5/23206 348/164 |
| 2015/0355103 A1 * | 12/2015 | Ando | G01N 21/8806 348/46 |
| 2017/0078532 A1 * | 3/2017 | Bryll | H04N 5/232122 |
| 2018/0143144 A1 * | 5/2018 | Mori | G01N 21/9501 |
| 2018/0300906 A1 * | 10/2018 | Lu | H04N 9/64 |
| 2018/0328789 A1 * | 11/2018 | Kido | G01J 3/462 |

(Continued)

FOREIGN PATENT DOCUMENTS

JP       2015232481 A    12/2015

OTHER PUBLICATIONS

U.S. Appl. No. 16/797,128, filed Feb. 21, 2020 (114 pages).

*Primary Examiner* — Marnie A Matt
(74) *Attorney, Agent, or Firm* — Kilyk & Bowersox, P.L.L.C.

(57) ABSTRACT

Accuracy of image inspection is improved by causing an imaging device conformable to a standardization standard to combine a plurality of captured images. A setting device transmits a setting content for realizing a combination setting set by a user on a user interface and register information indicating a location where the setting content is stored, to the imaging device. The imaging device stores the setting content in the location indicated by the corresponding register information, and executes the combination processing for combining the plurality of captured images.

8 Claims, 28 Drawing Sheets

(56) References Cited

U.S. PATENT DOCUMENTS

2018/0328855 A1\* 11/2018 Kido ................ H04N 5/232122
2018/0330489 A1\* 11/2018 Kido ....................... G06T 5/002

\* cited by examiner

FIG. 18

- 55a — ▼FILTERING IMAGE
  - FILTERING IMAGE NAME [ ]
  - TARGET IMAGE [NORMAL IMAGE ▼]
- ▼COLOR EXTRACTION SETTING
- 55b
  - EXTRACTION METHOD    AVERAGE GRAY
  - COLOR EXTRACTION SETTING [ SETTING ]

- ▼FILTER SETTING
- 55c
  - [ADD] [DELETE] [TO TOP] [TO BOTTOM]

| No | | FILTER KIND |
  |---|---|---|
  | | | |

- 55

- ▼OPTION
  - ☐ REGION SETTING
- 55d
  - OFFSET X (pixel) [100]
  - OFFSET Y (pixel) [100]
  - WIDTH (pixel) [100]
  - HEIGHT (pixel) [100]
  - [ REGION SETTING ]
  - ☐ POSITION CORRECTION
- 55e
  - SEARCH CLASSIFICATION [PATTERN SEARCH ▼]
  - SEARCH SETTING [ SETTING ]

FIG. 19

| NORMAL TURNING-ON MODE | PHOTOMETRIC STEREO MODE | MULTISPECTRAL MODE | PHOTOMETRIC STEREO SPECULAR REFLECTION MODE |
|---|---|---|---|
| NORMAL IMAGE | NORMAL IMAGE | MULTISPECTRAL IMAGE | SPECULAR REFLECTION IMAGE |
| | SHAPE IMAGE 1 | UV IMAGE | DIFFUSE REFLECTION IMAGE |
| | SHAPE IMAGE 2 | B IMAGE | SHAPE IMAGE 1 |
| | SHAPE IMAGE 3 | G IMAGE | SHAPE IMAGE 2 |
| | TEXTURE IMAGE | AM IMAGE | PHASE X IMAGE |
| | INCLINATION X IMAGE | R IMAGE | PHASE Y IMAGE |
| | INCLINATION Y IMAGE | FR IMAGE | GLOSS RATIO IMAGE |
| | PARTIAL TURNING-ON (UPPER) IMAGE | IR IMAGE | NORMAL IMAGE |
| | PARTIAL TURNING-ON (UPPER RIGHT) IMAGE | W IMAGE | X1 IMAGE |
| | PARTIAL TURNING-ON (RIGHT) IMAGE | | X2 IMAGE |
| | PARTIAL TURNING-ON (LOWER RIGHT) IMAGE | | X3 IMAGE |
| | PARTIAL TURNING-ON (LOWER) IMAGE | | X4 IMAGE |
| | PARTIAL TURNING-ON (LOWER LEFT) IMAGE | | Y1 IMAGE |
| | PARTIAL TURNING-ON (LEFT) IMAGE | | Y2 IMAGE |
| | PARTIAL TURNING-ON (UPPER LEFT) IMAGE | | Y3 IMAGE |
| | MOVING BODY TRACKING IMAGE 1 | | Y4 IMAGE |
| | MOVING BODY TRACKING IMAGE 2 | | |
| | AMBIENT LIGHT REMOVAL IMAGE | | |

FIG. 20

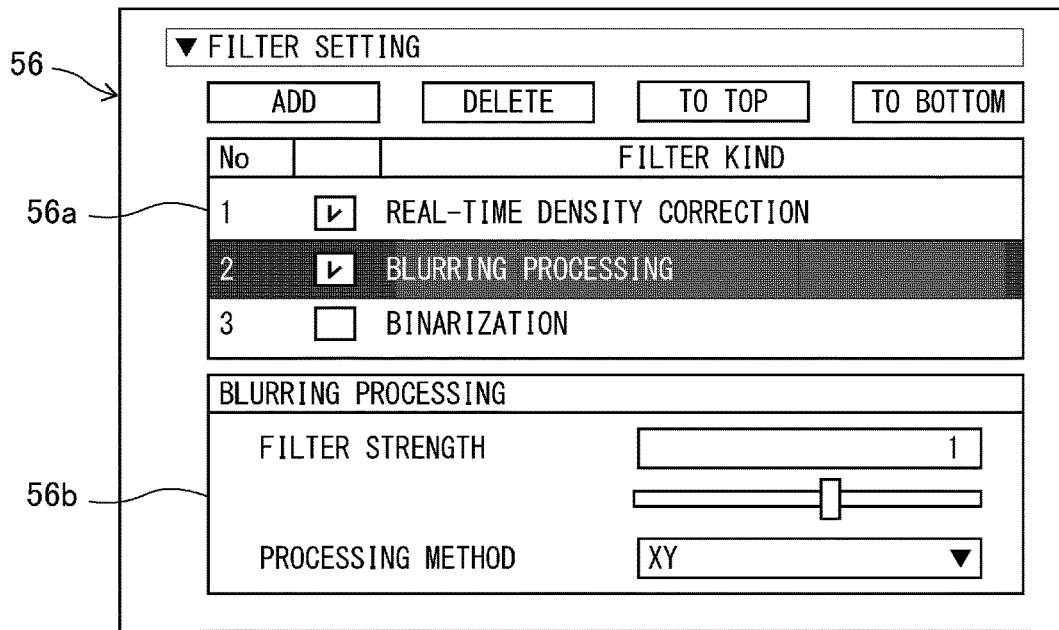

FIG. 21

| FILTER | DIRECTION | DEPENDENCY |
|---|---|---|
| BINARIZATION | | |
| DILATION | O | XY |
| EROSION | O | XY |
| AVERAGING | | |
| MEDIAN | | |
| EDGE | | |
| EDGE EXTRACTION X | O | |
| EDGE EXTRACTION Y | O | |
| SOBEL | | |
| PREWITT | | |
| ROBERTS | | |
| LAPLACIAN | | |
| DIFFERENCE | | |
| CONTRAST CONVERSION | | |
| REAL-TIME DIFFERENCE | | |
| REAL-TIME DENSITY CORRECTION | O | XY |
| BLURRING PROCESSING | O | XY |
| PROBE | | |
| LINE DEFECT EXTRACTION | O | ANGLE |
| NOISE CONTROL | | |
| CONTRAST DILATION | | |

*SINCE THERE IS DIFFERENCE FROM REGISTERED IMAGE, CORRECTION IS NECESSARY

FIG. 25

Category0-0

Category1-0

Register2-0

Register2-1 ⟵ DEPENDENCY RELATIONSHIP 1

Category1-1

Category2-2

Register3-0 ⟵ DEPENDENCY RELATIONSHIP 2

Register2-3 ⟵

Register1-2

FIG. 26

Category0-0

Category1-0

Register2-0

Register2-1 ⟵ DEPENDENCY RELATIONSHIP 1

Category1-1

Register2-3 ⟵

↕ Category2-2    DEPENDENCY RELATIONSHIP 2

Register3-0 ⟵

Register1-2

FIG. 28

| REGISTER APPEARANCE ORDER BEFORE REARRANGEMENT | | REGISTER APPEARANCE ORDER AFTER REARRANGEMENT | | OUTPUT LEDGER |
|---|---|---|---|---|
| LtrxSh1ImageEnable | | LtrxSh1ImageEnable | | LtrxSh1ImageEnable = True |
| LineInverter |  | LtrxSh1FeatureSize |  | LtrxSh1FeatureSize = 10 |
| LineSelector | | LineSelector | | LineSelector = F_OUT0 |
| LtrxSh1FeatureSize | | LineInverter | | LineInverter = True |
| | | | | LineSelector = F_OUT1 |
| | | | | LineInverter = False |
| | | | | LineSelector = F_OUT2 |
| | | | | LineInverter = True |
| | | | | ⋮ |

FIG. 29

SETTING Category OF PHOTOMETRIC STEREO MODE
　　LtrxImageSelection (SETTING Category FOR SELECTING IMAGE TO BE OUTPUT TO PC SIDE)
　　　　LtrxUpperRightImageEnable (WHETHER OR NOT TO OUTPUT IMAGE CAPTURED BY TURNING ON ILLUMINATION FROM UPPER RIGHT)
　　　　LtrxTrlImageEnable (WHETHER OR NOT TO OUTPUT IMAGE FOR TRACKING MOVING BODY)
　　LtrxLightControl
　　　　LtrxLightingCount (NUMBER OF TIMES OF SWITCHING IN ILLUMINATION TURNING-ON DIRECTION. ADD ONLY UPPER, LOWER, LEFT, AND RIGHT IN CASE OF 4 TIMES AND DIAGONAL DIRECTION IN CASE OF 8 TIMES)
　　LtrxOptions
　　　　LtrxObjectTrackignEnable (WHETHER OR NOT TO ENABLE MOVING BODY TRACKING)

FIG. 30

```
SETTING Category OF PHOTOMETRIC STEREO MODE
    LtrxImageSelection (SETTING Category FOR SELECTING IMAGE TO BE OUTPUT TO PC SIDE)
        LtrxUpperRightImageEnable (WHETHER OR NOT TO OUTPUT IMAGE CAPTURED BY
        TURNING ON ILLUMINATION FROM UPPER RIGHT)
        LtrxTrlImageEnable (WHETHER OR NOT TO OUTPUT IMAGE FOR TRACKING MOVING BODY)
    LtrxLightControl
        LtrxLightingCount (NUMBER OF TIMES OF SWITCHING IN ILLUMINATION TURNING-ON DIRECTION. ADD
        ONLY UPPER, LOWER, LEFT, AND RIGHT IN CASE OF 4 TIMES AND DIAGONAL DIRECTION IN CASE OF 8 TIMES)
    LtrxOptions
        LtrxObjectTrackignEnable (WHETHER OR NOT TO ENABLE MOVING BODY TRACKING)
```

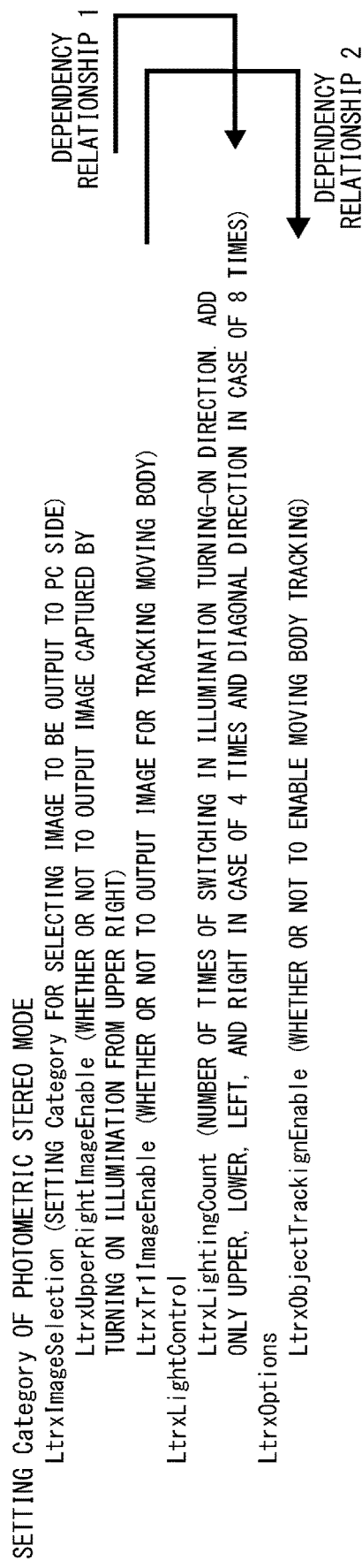

DEPENDENCY RELATIONSHIP 1

DEPENDENCY RELATIONSHIP 2

IMAGE INSPECTION SYSTEM AND IMAGE INSPECTION METHOD

CROSS-REFERENCE TO RELATED APPLICATIONS

The present application claims foreign priority based on Japanese Patent Application No. 2019-072974, filed Apr. 5, 2019, the contents of which are incorporated herein by reference.

BACKGROUND OF THE INVENTION

1. Field of the Invention

The present invention relates to an image inspection system and an image inspection method of inspecting an inspection object such as a workpiece.

2. Description of Related Art

In the related art, an image inspection system configured to measure a three-dimensional shape of an inspection object and determine whether the quality of the inspection object is good or bad based on a measurement result. An image inspection system disclosed in Japanese Unexamined Patent Publication No. 2015-232481 obtains a normal vector of a surface of the inspection object from a plurality of luminance images having different illumination directions, uses a principle of so-called photometric stereo of generating a shape image indicating a surface shape of the inspection object based on the normal vector, and determines whether the quality of the inspection object is good or bad with the inspection image indicating the shape generated based on the principle of photometric stereo. In Japanese Unexamined Patent Publication No. 2015-232481, after the inspection region is set in the inspection image by executing a pattern search, position correction of the inspection region is performed, and then, presence or absence of a scratch is inspected.

Such an image inspection system includes a control device such as a personal computer and a camera connected to the control device. The control device controls the camera, and the control device acquires an image captured by the camera. In general, various pieces of image processing and determination processing are performed. In such a system, in order for the camera to perform appropriate imaging, it is necessary to change a setting value such as an exposure time and an analog gain of the camera according to a situation and the inspection object, and the setting value of each setting item can be changed from the control device via a communication path. However, a correspondence between each setting item and an address of a register that retains the setting value is usually different for each model of the camera and for each manufacturer of the camera. For example, when the model of the camera is changed to another model, it takes a lot of effort such as correcting of a program of the image inspection application and reinstalling of driver software.

Therefore, in recent years, the GenICam standard is established as a standardization standard for a connection interface between the control device and the camera, and an interface for controlling the camera from the image inspection application constructed by the control device or acquiring the image captured by the camera is standardized between the camera satisfying the GenICam (registered trademark) standard and the application.

Incidentally, there is an advantage that the degree of freedom in selecting a model of the camera is improved by using a connection interface between the camera and the image inspection application conformable to the GenICam standard.

However, when the shape image is generated by capturing and combining the plurality of luminance images having different illumination directions as in Japanese Unexamined Patent Publication No. 2015-232481, it is necessary for the camera to perform imaging multiple times and combine the plurality of acquired captured images. However, in the camera conformable to the standardization standard, processing for combining the plurality of captured images. The same applies to not only a case where the principle of the photometric stereo in Japanese Unexamined Patent Publication No. 2015-232481 is used, but also, for example, a case where the inspection image is generated based on the principle of deflectometry and multispectral imaging for combining the plurality of captured images captured by applying light rays having different wavelengths.

SUMMARY OF THE INVENTION

The present invention has been made in view of the aforementioned circumstances, and an object of the present invention is to improve accuracy of image inspection by causing an imaging device conformable to a standardization standard to combine a plurality of captured images.

In order to achieve the aforementioned object, according to one embodiment of the invention, there is provided an image inspection system that includes an imaging device for an image inspection device which captures an image of an inspection object, and a setting device which is connected to the imaging device via a network, acquires a file in which a setting item of the imaging device and register information indicating a location where a setting value of each setting item is stored are described from an outside, transmits data indicating the setting value of each setting item set by a user and the register information corresponding to each setting item included in the file, to the imaging device, and sets the imaging device. A combination setting for combining a plurality of captured images is included, as a setting item related to processing to be applied to a captured image, in the file before the captured image captured by the imaging device is output to the outside. The setting device is configured to display a user interface, and transmit a setting content for realizing the combination setting set by the user on the user interface and register information indicating a location where the setting content is stored, to the imaging device. The imaging device is configured to store the setting content in the location indicated by the corresponding register information, and execute combination processing for combining the plurality of captured images.

According to this configuration, when both the imaging device and the setting device connected via the network conform to a common standardization standard, the setting device acquires from, for example, the imaging device the file in which the setting item of the imaging device and the register information indicating the location where the setting value of each setting item is stored are described. This file is, for example, a Device XML file when the standardization standard is the GenICam standard. This file may be acquired by the setting device from the imaging device. For example, a file that refers to GenApi may be designated as a separate file by being downloaded from a website.

When the user performs the combination setting, the combination setting set by the user is transmitted together with the register information to the imaging device. Accordingly, when the imaging device conforms to the standardization standard, it is possible to perform the combination setting by the setting device, and the degree of freedom in selecting the model of the imaging device is improved.

The imaging device stores the setting content in the location indicated by the corresponding register information, and executes the combination processing for combining the plurality of captured images. Accordingly, the imaging device conformable to the standardization standard can perform, for example, the generation of the inspection image using the principle of the photometric stereo or the deflectometry and the multispectral imaging.

According to another embodiment of the invention, the imaging device is configured to output an image on which the combination processing is executed, to the outside.

According to this configuration, after the imaging device combines the plurality of captured images, the combined image is output to the outside. An external quality determination unit can perform quality determination of the inspection object on the image after the combination processing is executed. The setting device may perform the quality determination of the inspection object on the combined image without outputting the combined image to the outside. In this case, a result of the quality determination of the inspection object is output to the outside.

According to still another embodiment of the invention, there is provided a search setting for performing position correction of the inspection object in the captured image is included, as the setting item related to the processing to be applied to the captured image, in the file, and the combination setting included in the file is a setting for combining the plurality of captured images based on a result of the position correction using the search setting, the setting device is configured to transmit a setting content for realizing the search setting and the combination setting set by the user on the user interface and register information indicating a location where the setting content is stored, to the imaging device, and the imaging device is configured to perform the position correction of the inspection object based on the search setting on the captured image, and execute the combination processing based on a result of the position correction using the search setting.

According to this configuration, when the user performs the search setting and the combination setting, the search setting and the combination setting set by the user are transmitted together with the register information to the imaging device. The imaging device stores the setting content in the location indicated by the corresponding register information, and performs the position correction of the inspection object based on the search setting on the captured image. The position correction of the inspection object includes, for example, correction for rotating the inspection object and correction for moving the inspection object in the X direction and the Y direction. After the position correction using the search setting is performed, since the combination processing is executed based on the result of the position correction, the captured images can be combined after the positions of the inspection objects of all the captured images are set to the predetermined positions.

According to still another embodiment of the invention, the imaging device is configured to acquire a plurality of luminance images having different illumination directions, and the combination processing is processing for generating a shape image by combining the plurality of luminance images based on a principle of photometric stereo.

According to this configuration, the shape image combined based on the principle of photometric stereo can be generated, and the inspection can be performed based on the shape image.

According to still another embodiment of the invention, the imaging device is configured to acquire a plurality of luminance images by sequentially applying a plurality of pattern light rays having different phases of illuminance distributions and performing imaging of the inspection object at a timing when the pattern light rays are applied, and the combination processing is processing for generating a shape image by combining the plurality of luminance images based on a principle of deflectometry.

According to this configuration, the shape image combined based on the principle of the deflectometry can be generated, and defect inspection can be performed based on the shape image.

According to still another embodiment of the invention, the imaging device is configured to acquire a plurality of luminance images by sequentially applying light rays having different wavelengths and performing imaging of the inspection object at a timing when the light rays are applied, and the combination processing is processing for generating a shape image by combining the plurality of luminance images by multispectral imaging.

According to this configuration, the shape image combined by the multispectral imaging can be generated, and the inspection can be performed based on the shape image.

According to still another embodiment of the invention, the imaging device is configured to acquire the plurality of captured images by performing imaging of the inspection object being transported multiple number of times and perform the position correction of the inspection object based on the search setting on the plurality of acquired captured images.

According to this configuration, when the imaging of the inspection object being transported is performed multiple times, the plurality of captured images on which positions of the inspection object are different between the captured images is acquired. After the position correction of the inspection object based on the search setting is performed on the plurality of acquired captured images, the combination processing is executed, and thus, the combined image can be generated in a state in which there is no shift in position of the inspection object.

According to one embodiment of the invention, there is provided an image inspection method of inspecting an inspection object by preparing an imaging device for an image inspection device which captures an image of the inspection object, and a setting device which is connected to the imaging device via a network, acquires a file in which a setting item of the imaging device and register information indicating a location where a setting value of each setting item is stored are described, from an outside, transmits data indicating the setting value of each setting item set by a user and the register information corresponding to each setting item included in the file, to the imaging device, and sets the imaging device. The method including adding a combination setting for combining a plurality of captured images, as a setting item related to processing to be applied to a captured image, to the file before the captured image captured by the imaging device is output to the outside, by the setting device, displaying a user interface, and transmitting a setting content for realizing the combination setting set by a user on the user interface and register information indicating a location where the setting content is stored, to the imaging device, and by the imaging device, storing the setting content in the location indicated by the corresponding register information, and executing combination processing for combining the plurality of captured images.

According to the present invention, since it is possible to combine a plurality of captured images by an imaging device conformable to a standardization standard, it is possible to perform generation of an inspection image using a principle of photometric stereo or deflectometry or multispectral imaging, for example.

BRIEF DESCRIPTION OF THE DRAWINGS

FIG. 18 is a diagram illustrating a filter setting user interface;

FIG. 19 is a diagram illustrating images on which filter processing can be executed in a list form;

FIG. 20 is a diagram illustrating a detailed user interface of the filter processing;

FIG. 21 is a diagram illustrating direction dependency of a filter;

FIG. 25 is a diagram illustrating an example of a ledger having a dependency relationship;

FIG. 26 is a diagram corresponding to FIG. 25 illustrating a state in which orders of a category and a register are replaced at the endmost;

FIG. 28 is a diagram illustrating appearance orders of registers before and after rearrangement and an output ledger;

FIG. 29 is a diagram illustrating an example of the appearance order of registers in a LumiTrax mode;

FIG. 30 is a diagram corresponding to FIG. 29 when an anteroposterior relationship between the registers is not in a setting order.

DETAILED DESCRIPTION OF PREFERRED EMBODIMENTS

Hereinafter, embodiments of the present invention will be described in detail with reference to the drawings. It should be noted that the following description of preferred embodiments is merely an example in nature, and is not intended to limit the present invention, the application thereof, or the purpose of use thereof.

Embodiment 1

Figure 1:
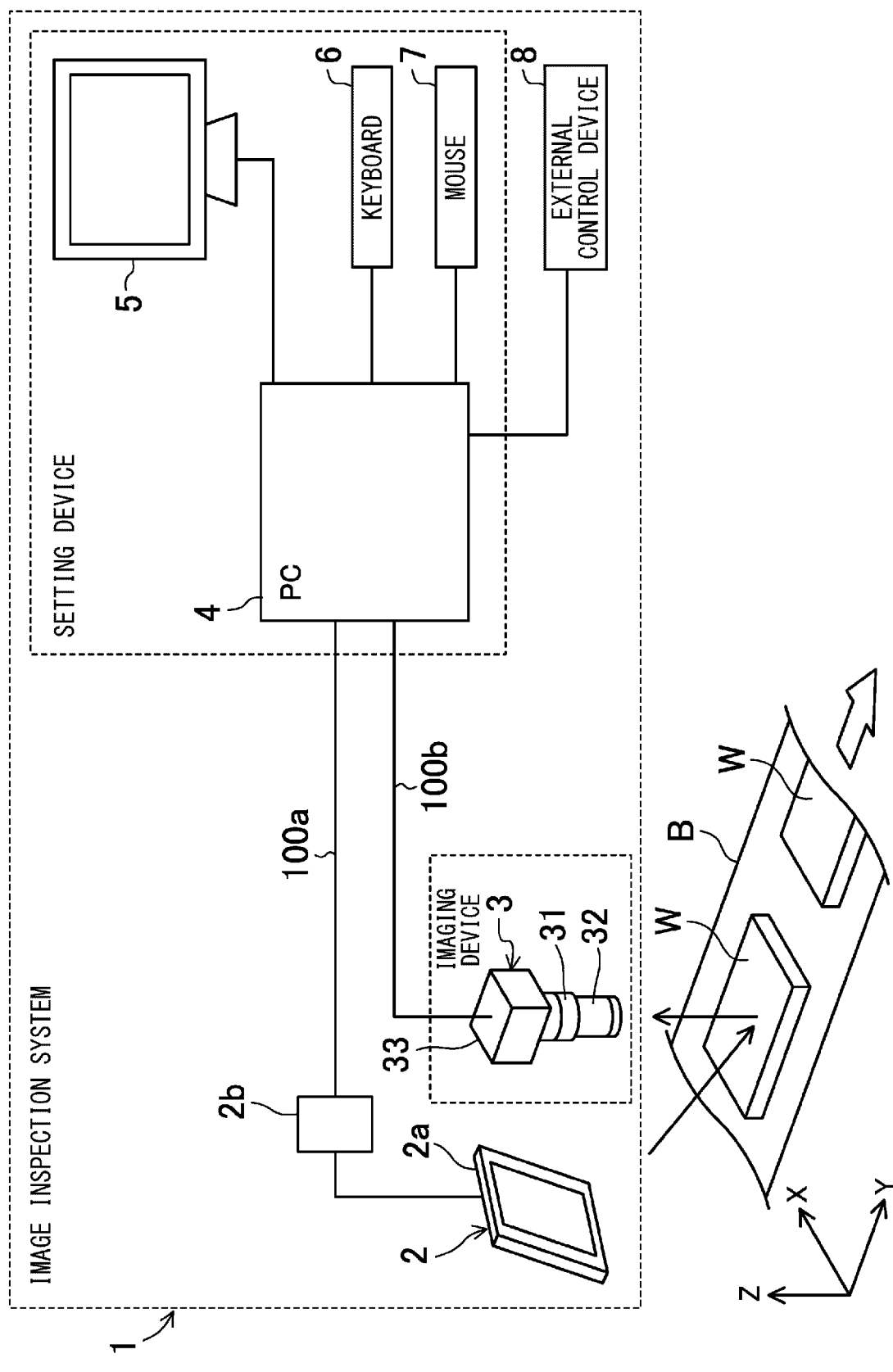
FIG. 1 is a schematic diagram illustrating a schematic configuration and an operation state of an image inspection system according to Embodiment 1 of the present invention.

FIG. 1 schematically illustrates an operation state of an image inspection system 1 according to an embodiment of the present invention. The image inspection system 1 is configured to inspect whether or not a workpiece W has a defect by using an image obtained by capturing an image of the workpiece W (inspection object), and includes an illumination device 2 that illuminates the workpiece W, an imaging device 3 for an image inspection device that captures an image of the workpiece W, and a setting device 4 constituted by a personal computer (PC) or the like that sets the imaging device 3. The setting device 4 includes a display unit 5, a keyboard 6, and a mouse 7. The display unit 5 is, for example, an organic EL display or a liquid crystal display, and is a part capable of displaying an image captured by the imaging device 3, an image obtained by performing various pieces of processing on the image captured by the imaging device 3, and various user interfaces (GUIs). Various user interfaces are generated in a main body of the setting device 4. A horizontal direction of the display unit 5 can be an X direction of the display unit 5, and a vertical direction of the display unit 5 can be a Y direction of the display unit 5.

The keyboard 6 and the mouse 7 are computer operating devices (operation means) known well in the related art. Various pieces of information can be input to the setting device 4 and an image and the like displayed on the display unit 5 can be selected by operating the keyboard 6 or the mouse 7.

For example, a computer operating device such as a voice input device or a pressure-sensitive touch operation panel can be used instead of the keyboard 6 and the mouse 7 or in addition to the keyboard 6 and the mouse 7.

For example, the setting device 4 is connected to an external control device 8 constituted by a programmable logic controller (PLC) or the like. The external control device 8 may constitute a part of the image inspection system 1. The external control device 8 may not be a component of the image inspection system 1.

FIG. 1 illustrates a case where a plurality of workpieces W is transported in a direction indicated by a white arrow in FIG. 1 in a state in which the workpieces are placed on an upper surface of a transport belt conveyor B. The external control device 8 is a device for controlling the transport belt conveyor B and the image inspection system 1 in sequence, and can use a general-purpose PLC.

In the description of this embodiment, a transport direction (a movement direction of the workpiece W) of the workpiece W by the transport belt conveyor B is defined as the Y direction, a direction orthogonal to the Y direction in plan view of the transport belt conveyor B is defined as the X direction, and a direction orthogonal (a direction orthogonal to the upper surface of the transport belt conveyor B) to the X direction and the Y direction is defined as the Z direction, but these definitions are merely definitions for the sake of convenience in description.

The image inspection system 1 can be used for inspecting an appearance of the workpiece W, that is, for inspecting whether or not a surface of the workpiece W has defects such as scratches, dirt, and dents, and can perform the quality determination of the workpiece W from this inspection result. During an operation, the image inspection system 1 receives an inspection start trigger signal that defines a start timing of the defect inspection (quality determination inspection) from the external control device 8 via a signal line. The image inspection system 1 captures an image of the workpiece W and illuminates the workpiece W based on the inspection start trigger signal, and obtains an inspection image after predetermined processing is performed. Thereafter, the appearance inspection is performed based on the inspection image, and the inspection result is transmitted to the external control device 8 through the signal line. As described above, during the operation of the image inspection system 1, an input of the inspection start trigger signal and an output of the inspection result are repeatedly performed between the image inspection system 1 and the external control device 8 through the signal line. As described above, the input of the inspection start trigger signal and the output of the inspection result may be performed between the image inspection system 1 and the external control device 8 via the signal line, or may be performed via other signals (not illustrated). For example, a sensor for detecting the arrival of the workpiece W and the image inspection system 1 may be directly connected, and the inspection start trigger signal may be input to the image inspection system 1 from the sensor. The image inspection system 1 may be configured to inspect the workpiece W by automatically generating the trigger signal.

The image inspection system 1 may be constituted by dedicated hardware, or may be constituted by installing software in a general-purpose device, for example, by installing an image inspection program in a general-purpose or dedicated computer. For example, the image inspection program may be installed in a dedicated computer that specializes hardware such as a graphic board for image inspection processing.

(Configuration of Illumination Device 2)

The illumination device 2 includes a light emitting unit 2a and an illumination control unit 2b that controls the light emitting unit 2a.

The light emitting unit 2a and the illumination control unit 2b may be separate or integrated. The illumination control unit 2b may be incorporated in the setting device 4. The light emitting unit 2a can be constituted by, for example, a light emitting diode, a projector using a liquid crystal panel, an organic EL panel, or a digital micromirror device (DMD), and can also be called an illumination unit. Although the light emitting diode, the liquid crystal panel, the organic EL panel, and the DMD are not illustrated, a light emitting unit having a structure known in the related art can be used. The illumination device 2 is connected to the setting device 4 via a signal line 100a, and can be installed separately from the imaging device 3 and the setting device 4.

The illumination device 2 according to Embodiment 1 is configured to perform uniform surface light emission. The illumination device 2 is configured to perform illumination capable of realizing the deflectometry processing, and includes the light emitting unit 2a that irradiates the workpiece W with pattern light having a periodic illuminance distribution. That is, the illumination device 2 can be a pattern light illumination unit that executes pattern light illumination that sequentially irradiates the workpiece W with a plurality of different pattern light rays. Hereinafter, the illumination device 2 used when the inspection image is generated by performing the deflectometry processing will be described.

When a plurality of light emitting diodes is used, it is possible to generate the pattern light having the periodic illuminance distribution by arranging the plurality of light emitting diodes in a dot matrix and controlling a current value. For example, when Y-direction pattern light of which brightness is changed in the Y direction, this pattern light can also be expressed as pattern light in which a striped pattern is repeated in the Y direction. When this Y-direction pattern light is generated, a phase of the illuminance distribution is shifted in the Y direction, and thus, a plurality of Y-direction pattern light rays having different phases of illuminance distributions can be generated. The illuminance distribution of the Y-direction pattern light can also be represented by a waveform approximating a sine waveform. In this case, a phase is changed by, for example, 90°. The Y-direction pattern light at the phase of 0°, the Y-direction pattern light at the phase of 90°, the Y-direction pattern light at the phase of 180°, and the Y-direction pattern light at the phase of 270° can be generated.

When X-direction pattern light of which brightness is changed in the X direction, this pattern light can also be expressed as pattern light in which a striped pattern is repeated in the X direction. When this X-direction pattern light is generated, a phase of the illuminance distribution is shifted in the X direction, and thus, a plurality of X-direction pattern light rays having different phases of illuminance distributions can be generated. The illuminance distribution of the X-direction pattern light can also be represented by a waveform approximating a sine waveform. In this case, a phase is changed by, for example, 90°. The X-direction pattern light at the phase of 0°, the X-direction pattern light at the phase of 90°, the X-direction pattern light at the phase of 180°, and the X-direction pattern light at the phase of 270° can be generated. That is, the illumination device 2 can illuminate the workpiece W in different illumination modes. When the deflectometry processing is performed, the pattern light applied to the workpiece W can be not only the pattern light of the sine waveform but also pattern light such as a triangular wave.

It is also possible to irradiate the workpiece with light of which the illuminance distribution is uniform within a plane by causing a current having the same current value to flow in all the light emitting diodes. When the current values passing through all the light emitting diodes are changed to be the same, a light emission state can be changed from a dark surface emission state to a bright surface emission state.

When the liquid crystal panel and the organic EL panel are used, the light applied from each panel can be the pattern light having the periodic illuminance distribution by controlling each panel.

When a digital micromirror device is used, the pattern light having the periodic illuminance distribution can be generated and applied by controlling a built-in micromirror surface. The configuration of the illumination device 2 is not limited to the aforementioned configuration, and any device or an apparatus that can generate the pattern light having the periodic illuminance distribution can be used.

As will be described below, an illumination device capable of individually applying illumination in at least three or more different directions can be used as the illumination device 2 used when the inspection image is generated by using a photometric stereo method. The illumination device 2 may be an illumination device configured to perform multispectral illumination, and the configuration of the illumination device 2 is not particularly limited.

(Configuration of Imaging Device 3)

The imaging device 3 includes a camera 31, a condensing system optical system 32, and an imaging control unit 33.

The imaging device 3 is connected to the setting device 4 via a signal line 100*b*, and can be installed separately from the illumination device 2 and the setting device 4.

The camera 31 includes an image sensor including an imaging element such as a CCD or a CMOS that converts the intensity of light obtained through the condensing system optical system 32 into an electric signal. The imaging control unit 33 includes a storage device and a signal processing device, and is a part that performs the control of the start and end of exposure of the camera 31, the control of an exposure time, and the adjustment of an analog gain. The driving of the image sensor and the transferring of the image data can be controlled by an internal logic circuit. Various pieces of image processing, filter processing, and the like can be performed by the imaging control unit 33, and the imaging device 3 is a device having a filter processing function.

The condensing system optical system 32 is an optical system for condensing light incident from the outside, and typically includes one or more optical lenses. The condensing system optical system 32 is configured to execute autofocus. A positional relationship between the imaging device 3 and the illumination device 2 can be set such that the light applied from the illumination device 2 toward the surface of the workpiece W is reflected by the surface of the workpiece W and is incident on the condensing system optical system 32. When the workpiece W is a transparent member such as a transparent film or sheet, the positional relationship between the imaging device 3 and the illumination device 2 can be set such that the pattern light applied from the illumination device 2 toward the surface of the workpiece W passes through the workpiece W and is incident on the condensing system optical system 32 of the imaging device 3. In any of the aforementioned cases, the imaging device 3 and the illumination device 2 are arranged such that a specular reflection component and a diffuse reflection component reflected by the surface of the workpiece W are incident on the condensing system optical system 32 of the imaging device 3. Although a line camera in which light receiving elements are linearly arranged in the Y direction can be used as the imaging device 3, an area camera (arranged such that the light receiving elements are arranged in the X and Y directions) other than the line camera can be used. In a case where this area camera is used, a form of coaxial illumination can also be performed.

Embodiment 2

Figure 2:
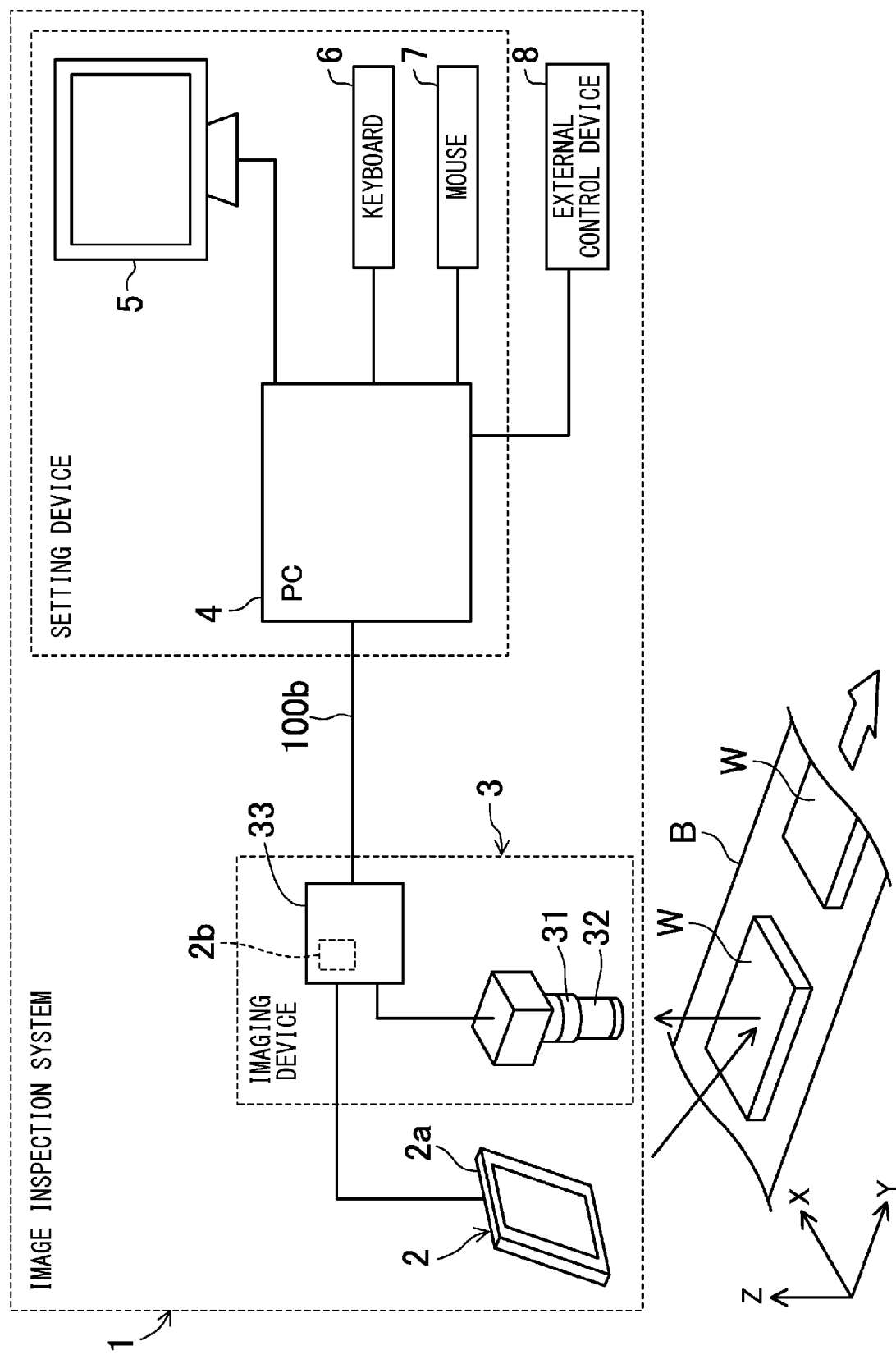
FIG. 2 is a diagram corresponding to FIG. 1 according to Embodiment 2.

FIG. 2 is a schematic diagram illustrating a schematic configuration and an operation state of an image inspection system according to Embodiment 2 of the present invention. In Embodiment 2, the imaging control unit 33 is separated from the camera 31 having the imaging element and the condensing system optical system 32, and the illumination control unit 2*b* is incorporated into the imaging control unit 33 and integrated. The imaging control unit 33 is connected to the setting device 4 via the signal line 100*b*. The imaging control unit 33 and the illumination control unit 2*b* can be separated.

Embodiment 3

Figure 3:
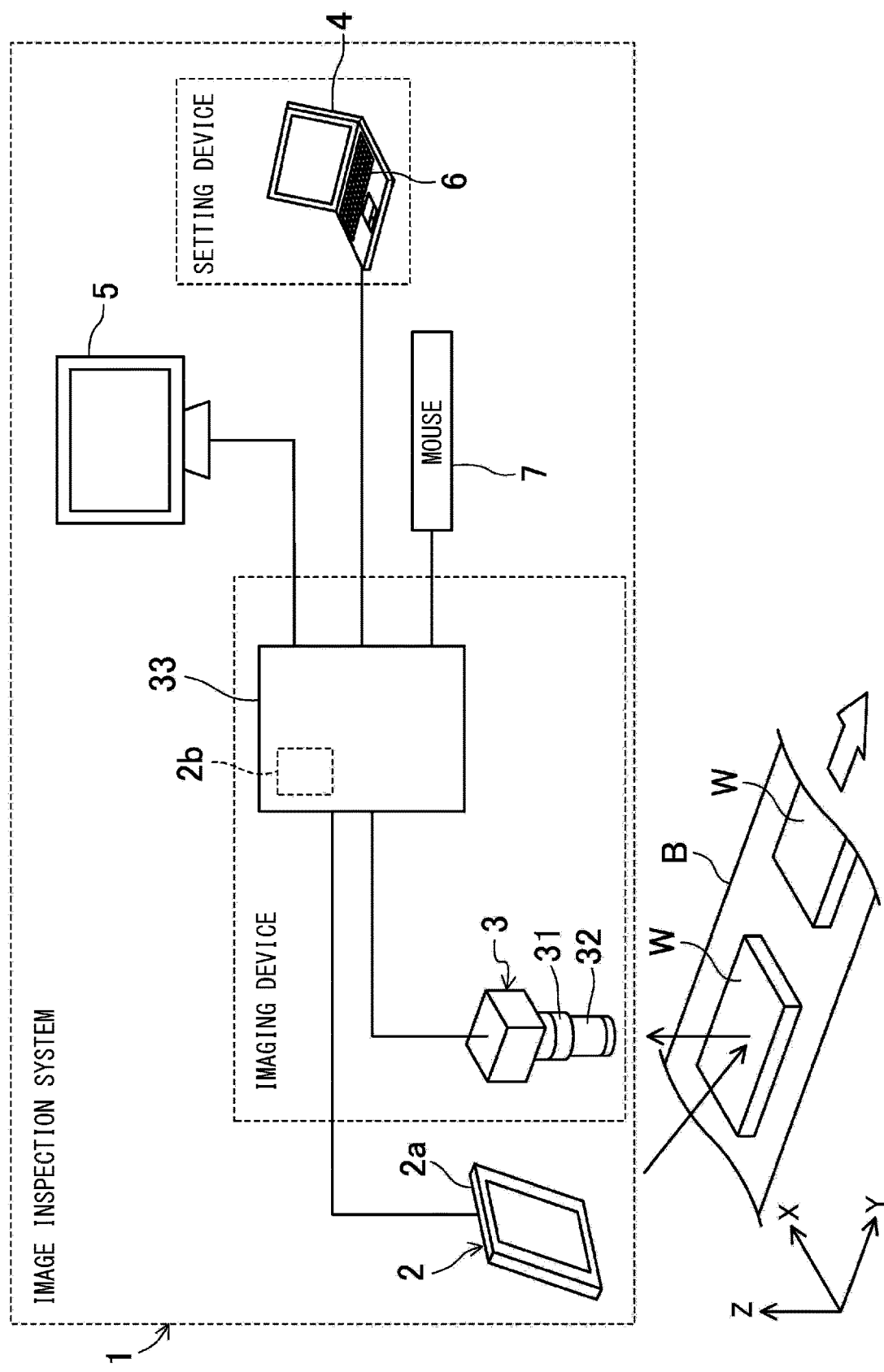
FIG. 3 is a diagram corresponding to FIG. 1 according to Embodiment 3.

FIG. 3 is a schematic diagram illustrating a schematic configuration and an operation state of an image inspection system according to Embodiment 3 of the present invention. In Embodiment 3, the illumination control unit 2*b* is incorporated and integrated into the imaging control unit 33, and the display unit 5 and the mouse 7 are connected to the imaging control unit 33. The setting device 4 is constituted by, for example, a notebook personal computer, and is connected to the imaging control unit 33.

The setting device 4 includes the keyboard 6. The mouse may be connected to the setting device 4. Various user interfaces generated by the setting device 4 can be displayed on the display unit 5 via the imaging control unit 33.

Embodiment 4

Figure 4:
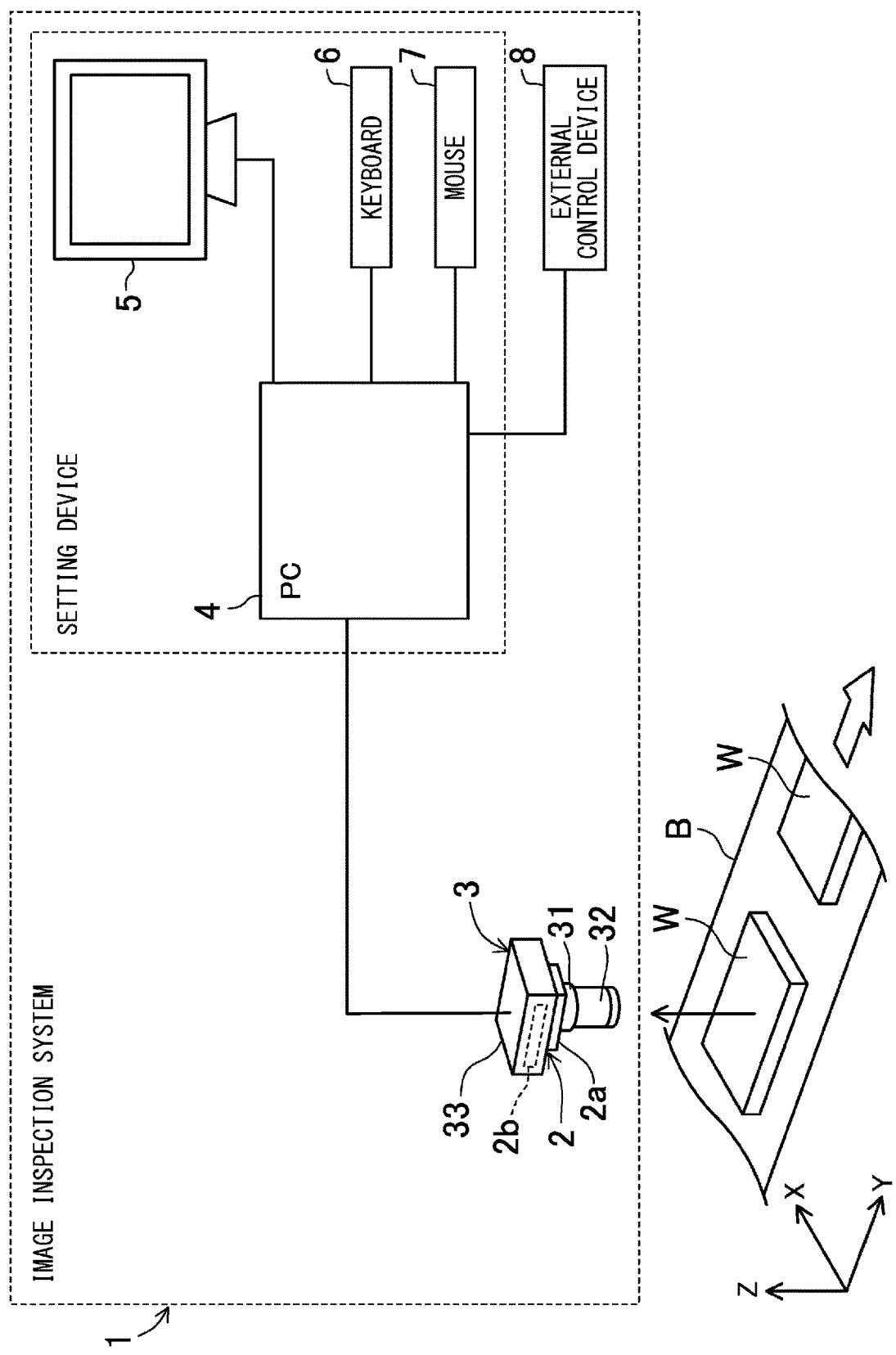
FIG. 4 is a diagram corresponding to FIG. 1 according to Embodiment 4.

FIG. 4 is a schematic diagram illustrating a schematic configuration and an operation state of an image inspection system according to Embodiment 4 of the present invention. In Embodiment 4, the illumination device 2 and the imaging device 3 are integrated, and the illumination control unit 2*b* and the imaging control unit 33 are also integrated. In Embodiments 2 to 4, the same parts as those in Embodiment 1 will be denoted by the same reference numerals, and description thereof will be omitted.

(Deflectometry Processing)

In Embodiments 1 to 4, deflectometry processing for generating phase data of the surface of the workpiece W from a plurality of luminance images captured by the imaging device 3 based on the principle of deflectometry and generating an inspection image indicating a shape of the workpiece W based on the phase data is performed.

Figure 5:
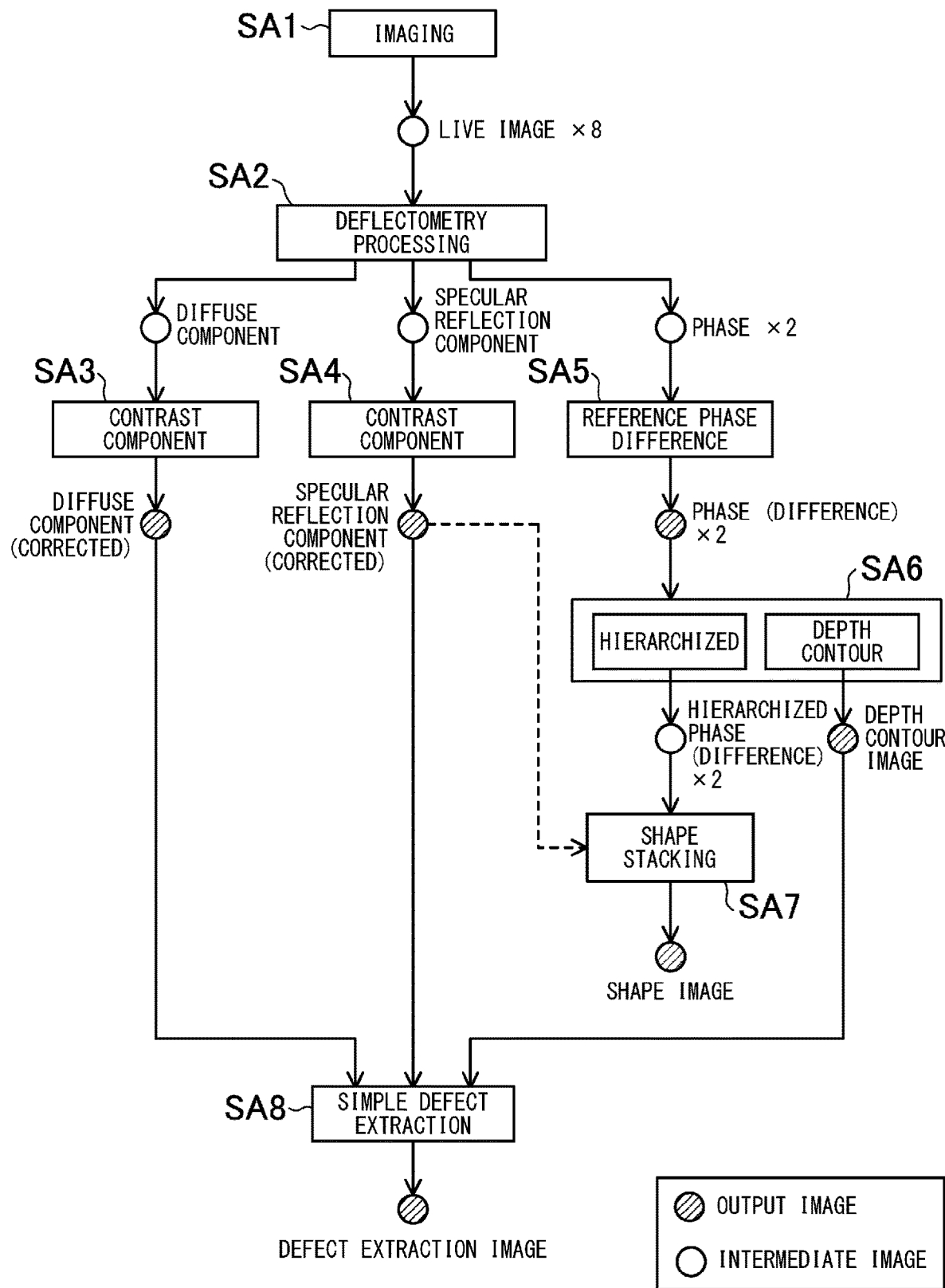
FIG. 5 is a flowchart illustrating a procedure for generating an inspection image based on a principle of deflectometry.

Hereinafter, the generation of the inspection image will be described in detail according to a flowchart illustrated in FIG. 5.

In step SA1 of the flowchart, the illumination device 2 generates the pattern light according to predetermined illumination conditions, and illuminates the workpiece W. The illumination condition at this time can be an illumination condition in which the Y-direction pattern light at the phase of 0°, the Y-direction pattern light at the phase of 90°, the Y-direction pattern light at the phase of 180°, the Y-direction pattern light at the phase of 270°, the X-direction pattern light at the phase of 0°, the X-direction pattern light at the phase of 90°, the X-direction pattern light at the phase of 180°, and the X-direction pattern light at the phase of 270° are sequentially generated. Accordingly, the illumination device 2 generates a total of eight kinds of pattern light rays (four kinds in the X direction and four kinds in the Y direction), and sequentially irradiates the workpiece W. Whenever the pattern light is applied, the imaging device 3 captures the image of the workpiece W. At the time of performing the imaging by the imaging device 3, since the number of times the pattern light is applied is eight, eight luminance images are obtained. Only the X-direction pattern light or only the Y-direction pattern light may be applied depending on the shape or the like of the workpiece W. The number of pattern light rays may be three.

Thereafter, the processing proceeds to step SA2, and the deflectometry processing is performed on the eight luminance images obtained in step SA1. The specular reflection component and the diffuse reflection component (+environmental component) are included in each pixel value of the obtained luminance image by capturing the image of the workpiece W irradiated with the pattern light. Since the phase of the illuminance distribution of the pattern light is shifted by 90° ($\pi/2$) in the X direction for capturing the images four times, four kinds of pixel values can be obtained by applying the X-direction pattern light. The diffuse reflection component, the specular reflection component, and a specular reflection angle (phase) are phase data, and can be calculated by a well-known calculation formula.

Similarly, since the phase of the illuminance distribution of the pattern light is shifted by 90° ($\pi/2$) in the Y direction for capturing the images four times, four kinds of pixel values can be obtained by applying the Y-direction pattern light. The diffuse reflection component, the specular reflection component, and the specular reflection angle (phase) can also be calculated in the Y direction.

For example, a specular reflection component image can be obtained by eliminating a diffuse component based on a difference between opposite phases. The specular reflection component image can be obtained by obtaining and combining these components in the X direction and Y direction. The specular reflection angle can be obtained by calculating an angle as $\tan \theta = \sin \theta / \cos \theta$ by using a specular reflection component shifted by $\pi/2$. An average image includes a diffuse component and an environmental component, and can be obtained by eliminating the specular reflection component by adding the opposite phases.

In step SA3, contrast correction is performed on a diffuse reflection component image. In step SA4, contrast correction is performed on the specular reflection component image. Each contrast correction can be linear correction. For example, an ROI average is corrected to a median value.

In the case of 8 bits, a median value may be 128 levels. Accordingly, a corrected diffuse component and a corrected specular reflection component are obtained.

In step SA5, a difference between a phase component and the reference phase is obtained. In step SA5, a difference is acquired with respect to a phase of a reference plane. For example, a user designates a spherical shape, a cylindrical shape, or a planar shape as the reference plane, and acquires a difference from the designated shape. Alternatively, the user may extract a difference with respect to a freeform surface. A corrected phase (difference) is obtained in the X direction, and a corrected phase is also obtained in the Y direction. The diffuse reflection component image, the specular reflection component image, and a reference phase difference image can be output images.

In step SA6, a hierarchized image and a depth contour image are obtained based on the reference phase difference image obtained in step SA5. The hierarchized image is an image in which ½ reduction is repeated. Accordingly, the images having hierarchized phases are obtained in the X and Y directions.

Meanwhile, the depth contour image is an output image in which a portion having a large phase difference is emphasized, and is a concept different from curvature. The depth contour image is obtained at a higher speed than a shape image obtained by stacking the shapes, and has an advantage that a line scratch of the workpiece W is extremely easy to see and a contour can be easily extracted.

Next, in step SA7, the shape image is generated by stacking the shapes on the images having the hierarchized phases. The shape image can be obtained by performing stack calculation by a Gauss-Jacobi method on the specular reflection angles in the X direction and the Y direction. The shape image is an output image.

In general, there are many examples in which the shape is restored by triangulation after unwrapping. In the present embodiment, the shape is restored regardless of the triangulation by avoiding unwrapping and performing the stack calculation of local differential values by the Gauss-Jacobi method. A known method can be appropriately used as the shape restoration method. A method that does not use the triangulation is preferable. A hierarchical method having a plurality of multi-stage reduced images can be used. A method having a difference between the reduced image and a normal image can also be used.

A feature size can be set as a parameter. The feature size is a parameter for setting a size of a scratch to be detected corresponding to the purpose and classification of the inspection. For example, the smallest scratch can be detected when a parameter value of the feature size is 1, and a large scratch can be detected by increasing this value. Accordingly, when the feature size is increased, it is easy to detect larger scratches, and scratches and irregularities on the surface of the workpiece W are clear.

In step SA8, simple defect extraction is performed. That is, after an image that is easy to inspect the line scratch (defect) of the workpiece W, an image that is easy to inspect the dirt (defect) of the workpiece W, and an image that is easy to inspect the dent (defect) of the workpiece W are generated, the defects appearing in the image are displayed on a defect extraction image.

The defect extraction image is an image that can extract and display the defects appearing in each image, and can also be referred to as a combined defect image since the extracted defects can be combined and displayed in one image.

For example, the specular reflection component image is an image that is easy to confirm the dirt that blunts specular reflection, the scratch that causes a change in shape but blunts specular reflection, or the scratch that does cause specular reflection due to a change in shape. The diffuse reflection image is an image that is easy to confirm a state (specifically, characters or darkened dirt on a printed matter) of the texture on the surface of the workpiece W. The shape image is an image obtained by stacking changes in phase while viewing surrounding pixels according to the feature size. Here, when the feature size of the shape image is set to be large, it is possible to catch relatively shallow unevenness having a large area even in the change in shape. Meanwhile, when the feature size of the shape image is set to be small, it is possible to catch a line scratch or a scratch having a small area. The defects (for example, fine scratches or deep scratches) that do hardly appear in the shape image tend to appear in the specular reflection component image. The depth contour image is an image obtained by calculating the reference plane and visualizing a shift from the reference plane. It is possible to catch the line scratch or the scratch having the small area from the depth contour image.

The defect extraction image on which the defects extracted after the simple defect extraction is performed in step SA8 are displayed is output.

Embodiment 5

Figure 6:
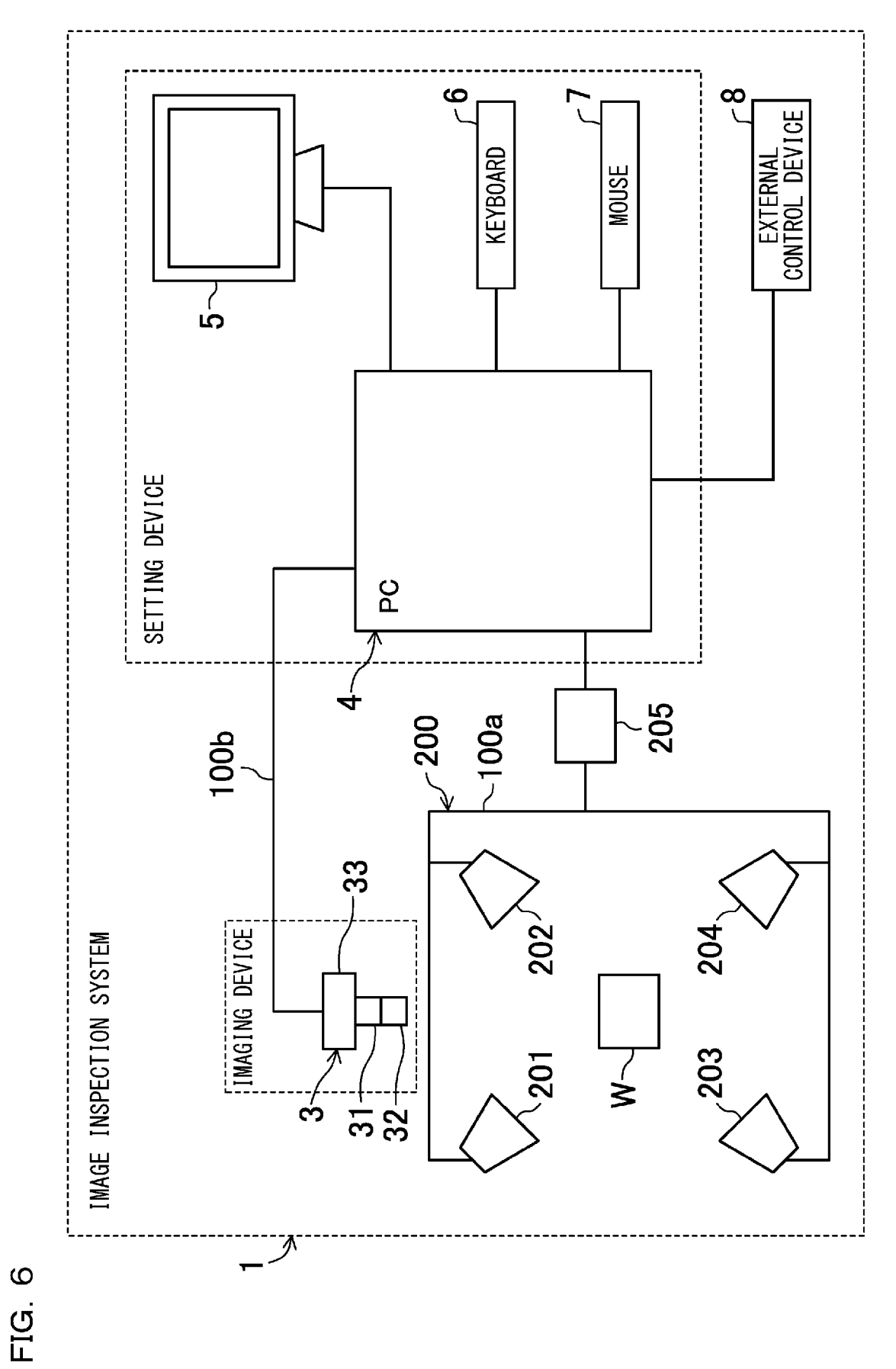
FIG. 6 is a diagram corresponding to FIG. 1 according to Embodiment 5 in which the inspection image is generated by using a photometric stereo method.

FIG. 6 is a schematic diagram illustrating a schematic configuration and an operation state of an image inspection system according to Embodiment 5 of the present invention. The inspection image is generated based on the principle of deflectometry in Embodiments 1 to 4, whereas the inspection image is generated by using the photometric stereo method in Embodiment 5.

Hereinafter, a specific method of generating the inspection image by using the photometric stereo method will be described in detail with reference to FIG. 6. The same parts as those in Embodiment 1 will be denoted by the same reference numerals, and description thereof will be omitted.

The image inspection system 1 according to Embodiment 5 can have the same configuration as that of the image inspection system disclosed in, for example, Japanese Unexamined Patent Publication No. 2015-232486. That is, the image inspection system 1 includes the imaging device 3 that captures an image of the workpiece W in a certain direction and the illumination device 200 that illuminates the workpiece W in three or more different illumination directions, and includes at least the display unit 5, the keyboard 6, and the mouse 7 similar to those in Embodiment 1.

The illumination device 200 is configured to irradiate the workpiece W with light in different directions, and includes an illumination control unit 205 that controls first to fourth light emitting units 201 to 204 and first to fourth light emitting units 201 to 204. The illumination device 200 is a part that executes multi-directional illumination that irradiates the workpiece W with light in different directions. The first to fourth light emitting units 201 to 204 are arranged so as to surround the workpiece W with a space therebetween. Light emitting diodes, incandescent bulbs, and fluorescent lamps can be used as the first to fourth light emitting units 201 to 204. The first to fourth light emitting units 201 to 204 may be separate or integrated.

In this embodiment, the first to fourth light emitting units 201 to 204 are sequentially turned on, and the imaging device 3 captures an image of the workpiece W at a point of time when any one of the first to fourth light emitting units 201 to 204 is turned on. For example, when the illumination device 200 receives a first illumination trigger signal, the illumination control unit 205 turns on only the first light emitting unit 201. At this time, the imaging device 3 receives an imaging trigger signal, and captures an image of the workpiece W at a timing when the light is applied. When the illumination device 200 receives a second illumination trigger signal, the illumination control unit 205 turns on only the second light emitting unit 202, and the imaging device 3 captures an image of the workpiece W at this time. In this manner, four luminance images can be obtained. The number of illuminations is not limited to four, and can be any number as long as the workpiece W can be illuminated in three or more different directions.

A normal vector with respect to the surface of the workpiece W of each pixel is calculated by using a pixel value for each pixel having a correspondence between the plurality of luminance images captured by the imaging device 3. The calculated normal vector of each pixel is differentiated in the X direction and the Y direction, and a contour image indicating a contour of an inclination of the surface of the workpiece W is generated. An albedo of the same number of pixels as the normal vector is calculated from the calculated normal vector of each pixel, and a texture rendered image indicating a pattern obtained by removing an inclination state of the surface of the workpiece W is generated from the albedo. Since this method is a well-known method, detailed description thereof is omitted. The shape image indicating the shape of the workpiece W can be generated by combining the plurality of luminance images based on the principle of the photometric stereo.

(Multispectral Illumination)

As another embodiment, the illumination device 2 capable of performing multispectral illumination may be used. The multispectral illumination refers to a case where the workpiece W is irradiated with light having different wavelengths at different timings, and is appropriate for the inspection of color unevenness, dirt, or the like of the printed material (inspection object). For example, the illumination device 2 can be configured such that yellow, blue, and red can be sequentially applied onto the workpiece W. Specifically, the illumination device 2 may include a multi-color LED, or the illumination device 2 may be configured by a liquid crystal panel, an organic EL panel, or the like.

The imaging device 3 captures an image of the workpiece W at the timing when the light is applied, and obtains the plurality of luminance images. The inspection image can be obtained by combining the plurality of luminance images. This imaging is called multispectral imaging. The shape image indicating the shape of the workpiece W can be generated by combining the plurality of luminance images by the multispectral imaging. The light to be applied can include ultraviolet rays and infrared rays.

(Connection Interface Between Camera and Image Inspection Application)

The camera 31 is a GenICam standard compatible camera corresponding to the GenICam standard.

Figure 7:
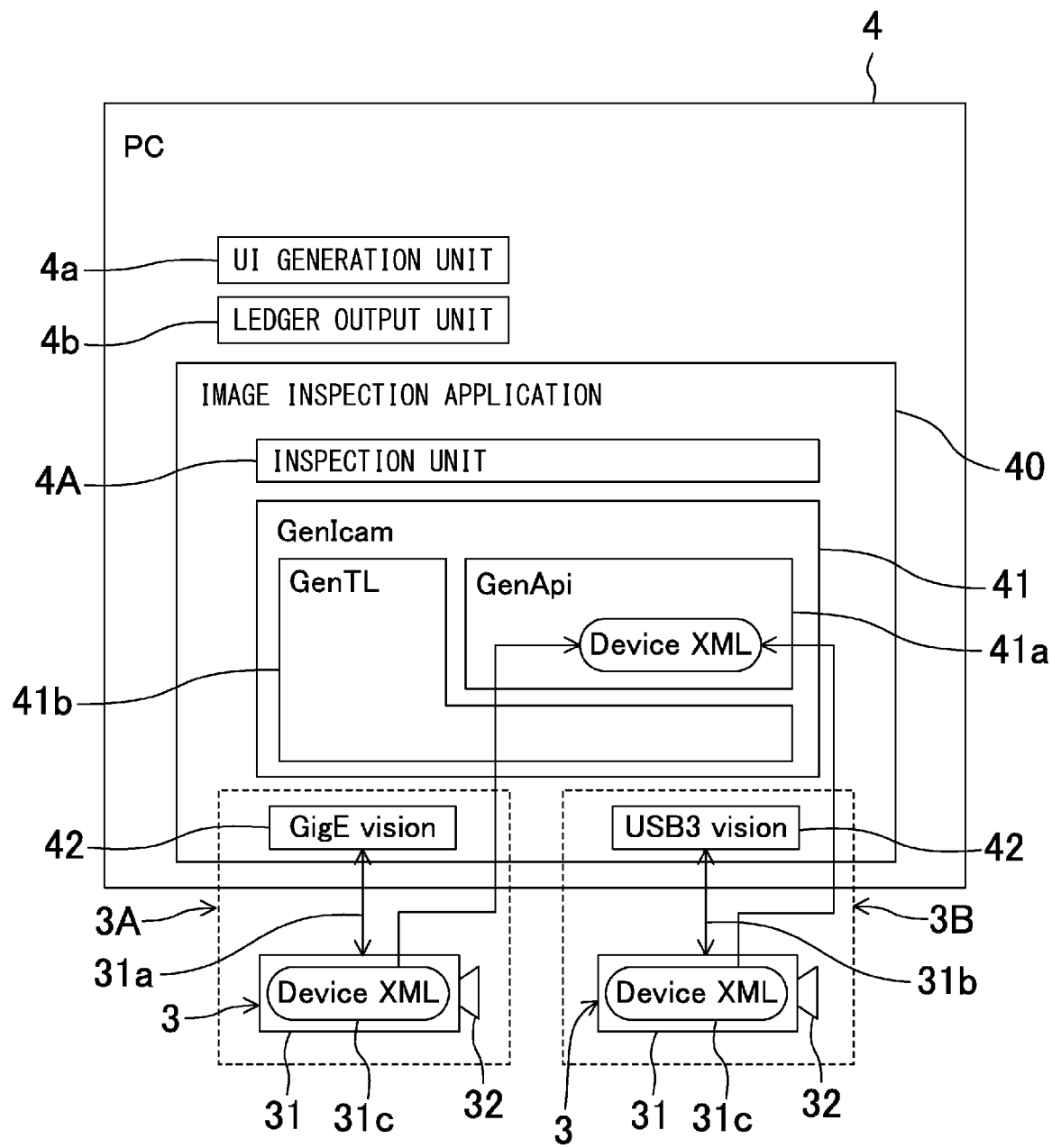
FIG. 7 is a diagram for describing a connection interface between an image inspection application and a camera.

The GenICam standard is a standard that standardizes the connection interface between the PC application and the camera 31. As illustrated in FIG. 7, the GenICam standard controls the camera 31 from an image inspection application 40 that is mainly constructed on a personal computer which is a main unit of the setting device 4, and standardizes an interface for acquiring an image captured by the camera 31 by using the image inspection application 40 of the setting device 4. When both the imaging device 3 and the image inspection application 40 of the setting device 4 correspond to the GenICam standard, the camera 31 and the image inspection application 40 of the setting device 4 can be connected. The image inspection application 40 is constituted by software installed on the personal computer. Although it has been described in this embodiment that the camera 31 and the setting device 4 correspond to the GenICam standard as a standardization standard, the standardization standard is not limited to the GenICam standard, and other standardization standards may be used.

When it is assumed that the image inspection application 40 is decomposed into a hierarchical structure, a GenICam layer 41 is a position of an intermediate layer positioned between a higher hierarchy (inspection unit 4A) that actually performs image inspection or defect inspection in the image inspection application 40 and a hierarchy 42 that performs control based on a specific network communication standard. The GenICam layer 41 can be roughly classified into two parts of GenApi 41a and GenTL (transport Layer (TL)) 41b. The GenApi 41a is a part that converts setting items of the camera 31 and internal register addresses of the camera 31. Due to the use of this GenApi41a, when the setting item is designated and is connected to the camera 31 by using a text such as "ExposureTime" for an exposure time or "AnalogGain" for an analog gain in an abstract concept as an argument without designating the specific address of the camera 31 from the image inspection application 40, a register address corresponding to a text (called Feature) can be calculated by analyzing a file called Device XML (details will be described below) acquired from the camera 31.

The GenTL 41b defines an interface (API) that controls the transfer of data between the image inspection application 40 and the camera 31. Specifically, the GenTL 41b defines the specifications of a write and read API for the register of the camera 31 and the specifications of an API that delivers image data transferred from the camera 31 to the higher layer of the image inspection application 40.

A physical standard that connects the image inspection application 40 and the camera 31 to each other may be a standard that uses a high-speed network, and is, for example, a GigE Vision standard 3A that uses an Ethernet cable 31a and a USB3 Vision standard 3B that uses a USB3.0 compatible cable 31b. Therefore, the imaging device 3 and the setting device 4 are connected via a network, but this network may be wired using a high-speed network cable or may be wireless. The network may be a network using a cable other than the Ethernet cable 31a or the USB3.0 compatible cable 31b, and is not particularly limited.

The GenICam standard used as a physical communication standard is not specifically specified, and defines a specification abstracted in the form of the GenTL 41b. As the lower hierarchy 42 of the GenTL 41b, the communication standard is defined by using the specific communication network such as the GigE Vision standard 3A or the USB3 Vision standard 3B. The specific communication standard is not limited to the GigE Vision standard 3A or the USB3 Vision standard 3B, but may correspond to the GenICam standard. Although it has been described in FIG. 7 that the cameras 31 and 31 corresponding to the standards are connected to the setting device 4 in order to describe the concept of the GigE Vision standard 3A and the USB3 Vision standard 3B, one camera 31 may be connected to the setting device 4.

The GenICam standard compatible camera 31 stores a file (Device XML file) 31c called Device XML. The Device XML file 31c is stored in a storage device (internal memory) built in the camera 31. In the image inspection application 40 corresponding to the GenICam standard, when the setting device is connected to the camera 31 which is a setting target by the image inspection application 40, the Device XML file 31c is read from the camera 31. For example, a method of downloading the Device XML file 31c from the camera 31 is used in order to read the Device XML file 31c. The downloaded Device XML file 31c is retained in the GenApi 41a. The Device XML file 31c can be downloaded according to a request from the image inspection application 40 or downloaded automatically when the setting device is connected to the camera 31. The setting device 4 can obtain the Device XML file 31c by downloading the Device XML file 31c. The Device XML file 31c corresponding to the camera 31 can be obtained by another means (for example, downloaded from a website) without being downloaded from the connected camera 31, and can be designated for the GenApi41a when the setting device is connected to the camera.

In the Device XML file 31c, all the setting items retained in the camera 31 are described in association with register addresses (register information) in which setting values of the setting items are stored. The setting item is called Feature, and a text for specifying each Feature is assigned to each Feature. A reference to a node in which a specific register address is described is described in a node of each Feature. The register information includes the register address and the text specifying the register.

For example, there is Feature named "ExposureTime" (exposure time setting) in the Device XML file 31c. An attribute of this feature is instructed to refer to a register address of "ExposureTimeReg", and a certain value is given as a specific address. When the cameras 31 are different, the addresses have different values, but the name of Feature of "ExposureTime" is used in common. In this manner, it is possible to set and control the camera 31 without having to be aware of a difference between models of the cameras 31 or a difference between manufacturers of the cameras in the image inspection application 40 by managing the setting items common to many cameras 31 with a unified name.

As described above, in the hierarchy of the GenApi 41a, the text of Feature delivered as the argument from the image inspection application 40 which is the higher hierarchy is converted into the address of the register by analyzing the description content of the Device XML file 31c. For example, when a certain value (value: 100.5) is written in the register corresponding to Feature of "ExposureTime", the value of the register of the camera 31 can be set through the physical communication standard such as the GigE Vision standard 3A or the USB3 Vision standard 3B by executing a function using two values of the address value and the value to be written as arguments such as WriteRegister (address value, 100.5).

Although the Device XML file 31c defines a Feature included as Feature common to manufacturers, it is also possible to define a vendor-specific Feature. In the case of the camera 31 having a unique function, the camera can have a special function that does not exist in a general-purpose camera by accessing the camera 31 through the dedicated Feature.

(Internal Processing Unit of Imaging Device 3)

Figure 8:
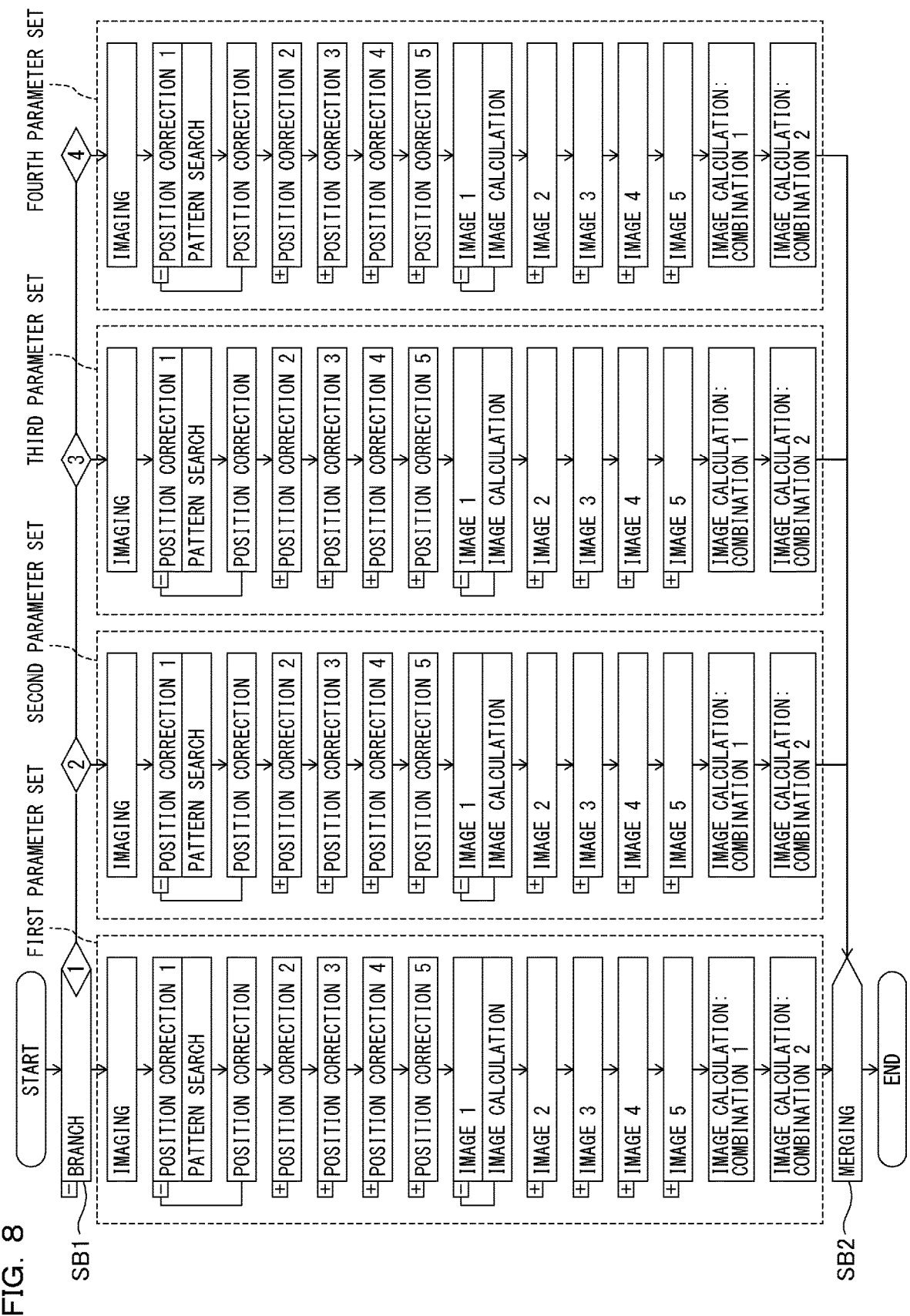
FIG. 8 is a flowchart conceptually illustrating an example of internal processing of an imaging device.

FIG. 8 is a flowchart conceptually illustrating an example of internal processing of the imaging device 3. Although it will be described in this flowchart that a group of position corrections 1 includes a pattern search unit and a position correction unit included in the group, but groups of the position corrections 2 to 5 are not described. This is because the groups of the position corrections 2 to 5 are folded for the sake of simplification in illustration.

As illustrated in this flowchart, the group is constituted by a combination of a plurality of units. The unit is a unit for controlling imaging and image processing, and the imaging device 3 can realize a desired operation by combining the units on the flowchart. In the flowchart illustrated in FIG. 8, the unit is described as one step.

For example, when a function of performing certain processing is enabled by the setting of the user, the processing can be executed by adding the unit corresponding to the function. The unit can be defined as an assortment of a program that executes the processing, a parameter necessary for executing the processing, and a storage region that stores data of the processing result. Each processing can be performed by the imaging control unit 33 illustrated in FIG. 1, and the storage region can be secured in the storage device of the imaging control unit 33. The concept of the unit itself is not essential when the external specifications of the camera 31 corresponding to the GenICam standard are realized.

The flowchart illustrated in FIG. 8 is obtained by arranging the plurality of units in a vertical direction and a horizontal direction in the form of a flowchart, and can be simply called a flow. This flowchart may be a flowchart in which the plurality of units is arranged only in the vertical direction. The processing is executed in order from the start to the end of the flowchart illustrated in FIG. 8, but it is also possible to branch this flowchart by preparing branch step SB1 in the middle. When the flowchart is branched, merging step SB2 can be prepared up to the end, and thus, the processing can proceed to the end from the merging step.

(Parameter Set)

When the image inspection application 40 is operated in an actual inspection environment and the workpiece W is switched or a change in the surrounding environment such as brightness is detected, setting parameters of the imaging device 3 may be dynamically changed. When only a very limited parameter such as the exposure time is changed, it is possible to cope with such a change by directly writing the value of the corresponding Feature from the image inspection application 40.

Meanwhile, when a high-functional imaging device 3 is used, the number of items capable of being set increases, and the number of parameters to be changed at a time also increases when the workpiece W is switched. In this case, a time required for the setting change becomes longer in proportion to the number of parameters. In an actual image inspection line, the workpiece W is switched, and it takes a short time for a new workpiece W to reach an imaging field of view of the imaging device 3 until the workpiece is out of the imaging field of view in many cases. Thus, there is a case where a series of setting changes are performed at a high speed. In such a case, a function called a parameter set may be used.

In the parameter set, combinations of various parameters at the time of performing the imaging in the imaging device 3 are retained with a plurality of patterns in advance, and each pattern can be managed by a parameter set number. For example, in a case where there are three kinds of workpieces W and the user wants to perform the imaging and the subsequent processing by using different parameters, three parameter sets are prepared.

When the parameter sets are used, the series of setting changes can be completed in a short time by merely designating the parameter set number corresponding to the kind of the workpiece W to be captured next before the workpiece W is captured. When viewed from the image inspection application 40, the Feature that designates the parameter set number can be considered as a kind of a selector to be described below.

A selector that switches a target to be set from the image inspection application 40 side and a register that switches the parameter that is internally referred to by the imaging device 3 during the operation can be independently provided, or may be the same. An upper limit of the number of parameter sets capable of being set is limited to a parameter retaining space of an internal memory provided within the imaging device 3.

The concept of the parameter set can also be developed in the imaging device 3 having a filter processing function. For example, it is assumed that the parameter corresponding to the parameter set Index is set such that when a parameter set Index is 1, a binarization filter is executed, when a parameter set Index is 2, a dilation filter is executed, and when a parameter set Index is 3, the filter is not executed. By doing so, it is possible to dynamically switch between the imaging and the content to be executed as the filter processing by using the parameter set Index.

The GenICam standard supports a function for dynamically switching imaging parameters. The imaging device 3 can access all the setting parameters by using the Features according to the GenICam standard. As an imaging function, there is a plurality of illumination and imaging control modes such as a function of combining images captured in a plurality of patterns by synchronizing the illumination device 2 and the imaging device 3 with each other according to a dedicated algorithm (generating an inspection image using the principle of the deflectometry described above) and a multispectral imaging function of acquiring a plurality of images by applying light having different wavelengths. These modes can be set for each parameter set described above, and it is possible to execute imaging processing, filter processing, combination processing, and image output while dynamically switching between the modes according to conditions. The images generated by the imaging function may be the image itself acquired by the image sensor while switching between turning-on patterns of the illumination, or may include a plurality of images combined according to the dedicated algorithm described above.

The filter processing can set a plurality of patterns within the same parameter set. For example, in the aforementioned imaging function, the images are generated in the plurality of patterns by executing a series of imaging, and it is possible to individually perform the filter processing on the plurality of generated different images. In another pattern, it is possible to perform the filter processing only within each region by setting a specific region range (region of interest (ROI). The specific region range can be set by operating, for example, the keyboard 6 or the mouse 7. The specific region may be one or plural. A size of the specific region can be arbitrarily set.

The filter processing may be a multi-stage filter that can repeatedly set a plurality of kinds in multiple stages for the same image. For example, after dilation filter processing is performed on a certain image, binarization filter processing can be performed on the image. The filter processing is not limited to the multi-stage filter, and may be single filter processing.

The plurality of parameter sets can be represented in one flowchart as illustrated in FIG. 8 by using the function of dynamically switching between the imaging parameters of the GenICam standard. On an internal processing flowchart of the imaging device 3, a unit group forming a flowchart from branch step SB1 to merging step SB2 is collectively referred to as a parameter set. In the example illustrated in FIG. 8, there are four parameter sets, that is, first to fourth parameter sets. That is, there are combinations of values of a plurality of selectors for realizing the processing set by the user in a plurality of patterns. The user can set which of the first to fourth parameter sets is selected, for example, automatically selects the first parameter set when a parameter set number 1 is selected.

After the start of the flowchart illustrated in FIG. 8, the processing can pass through each unit constituting any one of the first to fourth parameter sets in branch step SB1, can be subsequently merged in merging step SB2, and can proceed to the end. When the parameter set number 1 is selected, a branch number becomes 1 in branch step SB1, and each processing of the first parameter set is executed. When a parameter set number 2 is selected, the branch number becomes 2 in branch step SB1, and each processing of the second parameter set is executed. When a parameter set number 3 is selected, the branch number becomes 3 in branch step SB1, and each processing of the third parameter set is executed. When a parameter set number 4 is selected, the branch number becomes 4 in branch step SB1, and each processing of the fourth parameter set is executed. The number of parameter sets is not limited to four, and can be arbitrarily set.

Figure 9:
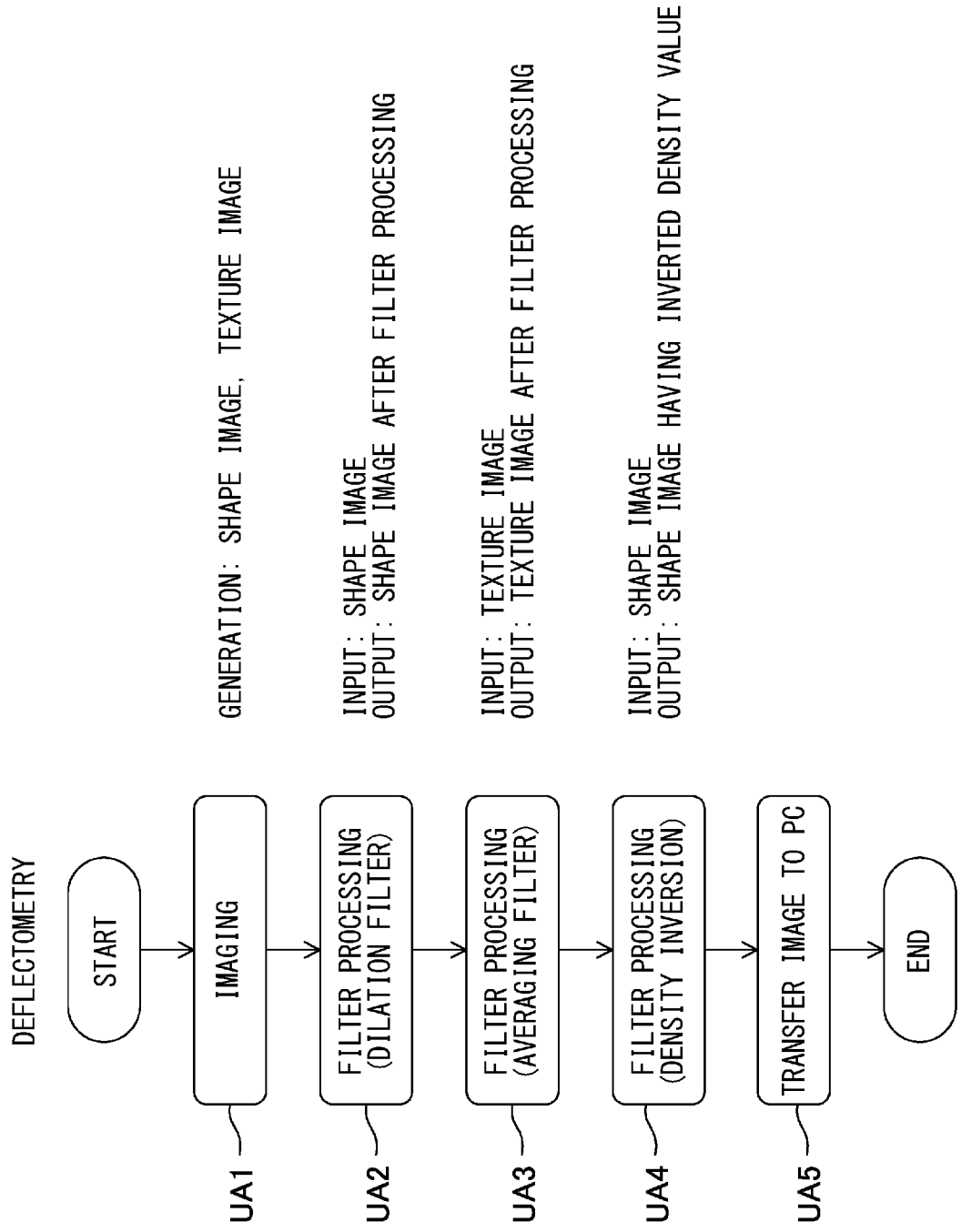
FIG. 9 is a diagram illustrating a parameter set when the inspection image is generated by using the principle of deflectometry.
Figure 10:
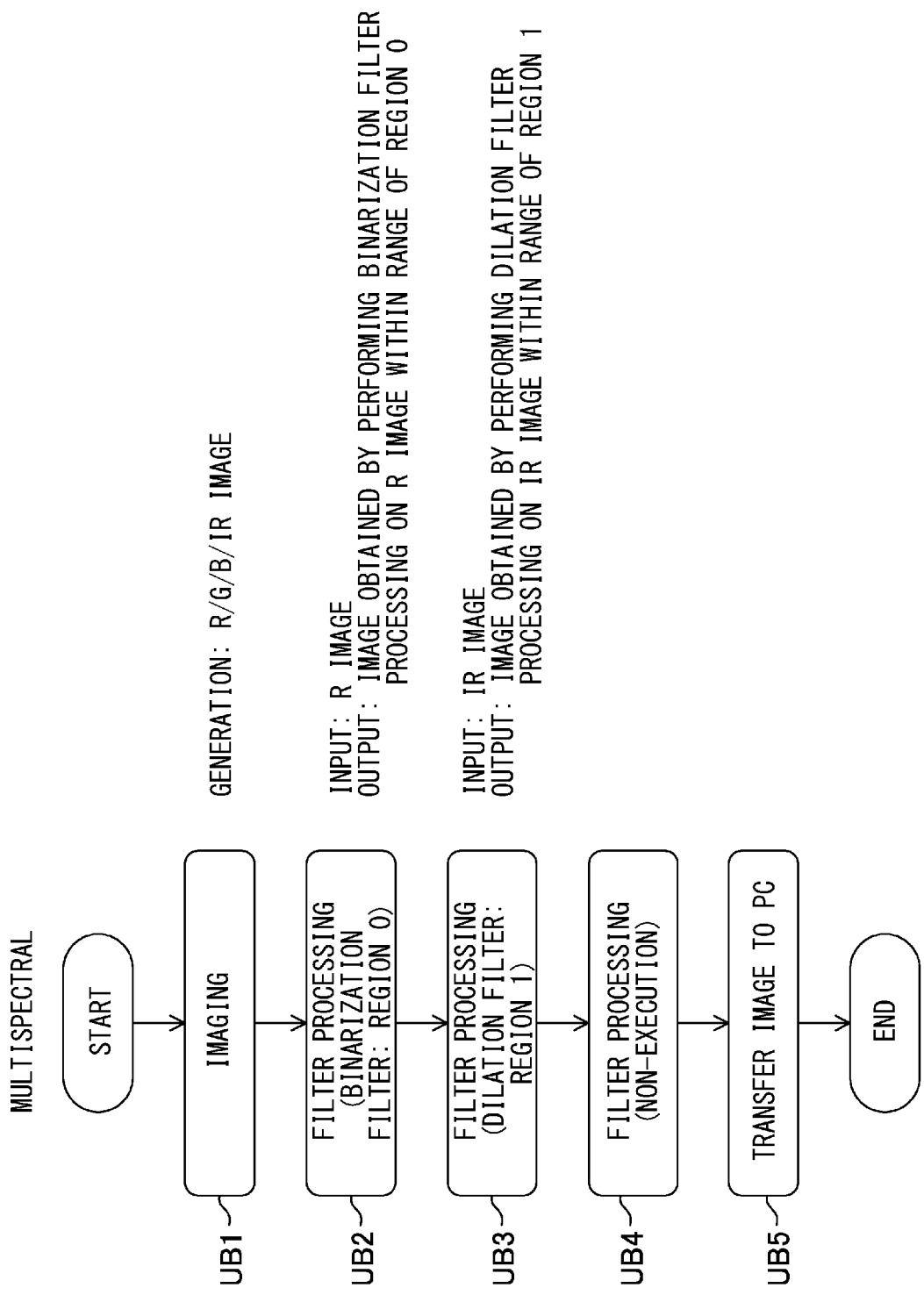
FIG. 10 is a diagram illustrating the parameter set when the inspection image is generated by multispectral imaging.

Specific examples of the parameter set are illustrated in FIGS. 9 and 10. FIG. 9 is a parameter set when the inspection image is generated by using the principle of the deflectometry. In a unit UA1, a plurality of pieces of imaging processing is performed by using a single trigger signal such that the inspection image is generated by using the principle of the deflectometry. The dilation filter processing is executed in a unit UA2, averaging filter processing is executed in a unit UA3, and density inversion processing is executed in a unit UA4. That is, the multi-stage processing defined by the parameter sets including the filter processing is sequentially executed on the captured image captured in the unit UA1. Thereafter, in a unit UA5, the image data on which the multi-stage processing is sequentially executed is transferred to the PC, that is, output to the setting device 4 or the like as an external device. The image data may be retained inside without being transferred. It is possible to perform the setting such that the multi-stage processing is not performed in some parameter sets. When the image data is transferred to the setting device 4, the inspection unit 4A of the image inspection application 40 illustrated in FIG. 7 can perform the defect inspection and the quality determination. An algorithm known in the related art can be used as the algorithms of the defect inspection and the quality determination.

Meanwhile, FIG. 10 illustrates the parameter set when the inspection image is generated by the multispectral imaging. In a unit UB1, a plurality of pieces of imaging processing is performed by using a single trigger signal such that the inspection image is generated by the multispectral imaging. Binarization filter processing is executed for a certain region (region 0) in a unit UB2, and the dilation filter processing is executed for a region (region 1) different from the region 0 in a unit UB3. That is, in this example, the multi-stage processing defined by the parameter set including the filter processing is also sequentially executed on the captured image captured in the unit UB1. Thereafter, the processing is not executed in a unit UB4. In a unit UB5, the image data is transferred to the PC as in the case illustrated in FIG. 9. As in this example, a unit in which the processing is not performed, that is, a disabled unit may be present within the parameter set, and a parameter set includes a mixture of the enabled unit and the disabled unit.

Therefore, since the imaging device 3 can execute the multi-stage processing in order on the captured image as set by the setting device 4, the user can freely set a procedure having orderliness, and the imaging device 3 can perform complicated image processing. It is also possible to reflect a setting having no orderliness such as the exposure time.

(Kind of Unit)

There is a plurality of kinds of units. For example, there is a high-functional unit obtained by combining a pattern search unit that performs pattern search processing for deciding an inspection region, a position correction unit, an image calculation unit that performs position correction, color extraction, or filter processing of the image, and a unit that performs relatively simple processing. The units are units for executing the processing to be applied to the captured image before the captured image captured by the imaging device 3 is output to the outside. As illustrated in FIGS. 9 and 10, the units can be arranged so as to perform the multi-stage processing on the captured image.

The pattern search unit is a unit that searches for the workpiece W and an inspection target portion of the workpiece W from the image including the workpiece W captured by the imaging device 3 and performs the position correction of the workpiece W in the captured image. For example, when the image inspection system 1 is set, edge detection is performed by a well-known edge detection method on the image obtained by capturing an image of the workpiece W, and thus, a region specified by the detected edge can be stored as a model (searching model image) of the workpiece W or the inspection target portion of the workpiece W in the storage device of the imaging device 3. The edge detection processing itself can be performed by using a method known in the related art. For example, a pixel value of each pixel on the luminance image is acquired, and when there is a region in which a change in pixel value on the luminance image is equal to or greater than a threshold value for edge detection, a boundary portion thereof is extracted as an edge. The threshold value for edge extraction can be arbitrarily adjusted by the user.

After the image inspection system 1 is set, during the operation of the image inspection system 1, the inspection image is obtained by capturing an image of the workpiece W sequentially transported, and the pattern search unit determines whether or not there is the workpiece W or the inspection target portion of the workpiece W on the obtained inspection image by the search processing based on the stored model, and measures a position and an angle of the workpiece W by the search processing.

The position of the workpiece W can be specified by an X coordinate and a Y coordinate. The angle of the workpiece W can be an angle around an optical axis of the imaging device W or an angle around a Z axis illustrated in FIG. 1.

The position correction unit is unit that performs the position correction of the workpiece W in the image after the pattern search unit searches for the workpiece W and the inspection target portion of the workpiece W from the image including the workpiece W captured by the imaging device 3 and measures the position and the angle of the workpiece W. During the operation of the image inspection system 1, the plurality of workpieces W may not be transported at the same position and posture, and the workpieces W present at various positions and the workpieces W present in various postures may be transported. Since the pattern search unit can search for a reference portion of the workpiece W and the position correction unit can subsequently perform the position correction, the position correction is performed by rotating the image or moving the image in the vertical direction or the horizontal direction such that the reference portion of the workpiece W is constantly at a fixed position and the workpiece W is set in a predetermined posture. For example, a plurality of kinds of tools such as pattern search can be prepared as a position correction tool for performing the position correction.

There is a plurality of types of image calculation units. For example, there are a unit that performs the filter processing, a unit that performs combination processing for combining the plurality of images captured by the imaging device 3, a unit that performs the deflectometry processing, a unit that generates the inspection image by using a photometric stereo method, and a unit that performs the multispectral imaging. Since there is a plurality of kinds of filter processing, a plurality of kinds of units that performs the filter processing such as the binarization filter and the dilation filter can be provided. As described above, since the generation of the inspection image by the deflectometry processing is performed by the plurality of pieces of processing, a unit may be provided for each processing, and a unit that generates the specular reflection component image, a unit that generates the diffuse reflection component image, and a unit that generates the reference phase difference image can be provided.

(Preprocessing Module)

Figure 11:
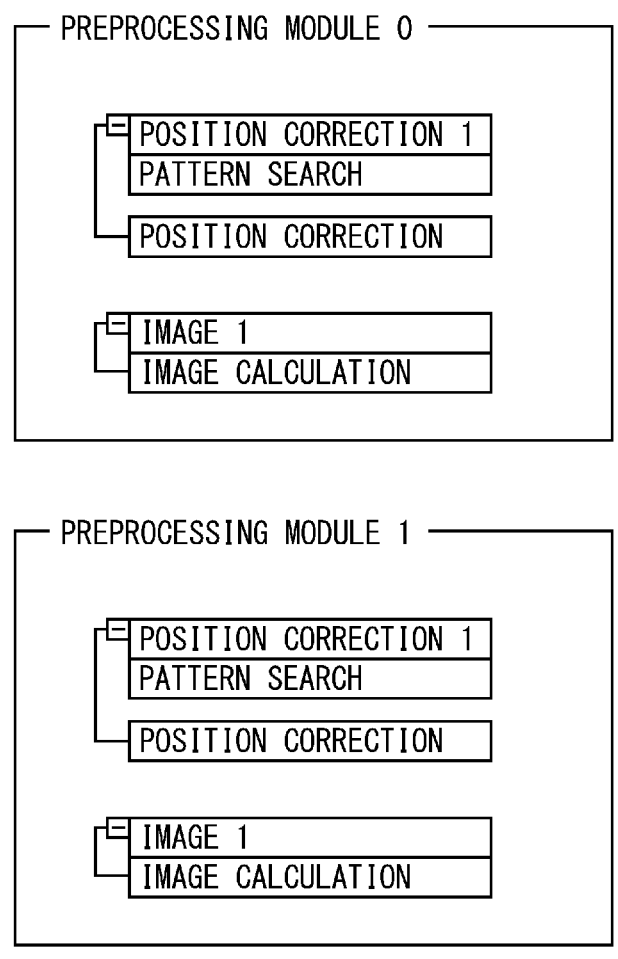
FIG. 11 is a diagram illustrating a configuration of a preprocessing module.

FIG. 11 illustrates an example of a preprocessing module. The preprocessing module can be a combination of a group constituted by the pattern search unit and the position correction unit and the image calculation unit, but this is an example. The preprocessing module may be a preprocessing module constituted by only one group or may be a preprocessing module in which other arbitrary units are combined. The preprocessing modules are denoted by numbers, and can be distinguished from "preprocessing module 0" and "preprocessing module 1".

A plurality of preprocessing modules can be added or set in order to enhance the extensibility of the function, and the preprocessing modules are identified by indices such as "preprocessing module 0 (PreprocessingModule0)" and "preprocessing module 1 (PreprocessingModule1)".

(Selector)

The plurality of preprocessing modules can be added to any one parameter set in the flowchart illustrated in FIG. 8. For example, an arbitrary preprocessing module can be added by the setting parameter for executing the pattern search processing and the setting parameter for executing the filter processing.

However, when an individual setting register is provided in each preprocessing module, since the same register (Feature) repeatedly appears, redundancy occurs. In this embodiment, an editing target (setting target) can be dynamically switched by using the selector. The setting targets capable of being switched by the selector include, for example, a parameter set (branch number), a preprocessing module number, and the number of stages of the filters (which stage of the filters is set) in a case where the multistage filter is used. That is, a Feature that designates the parameter set number, a Feature that designates the preprocessing module number, and a Feature that designates the number of stages of the filters are kinds of the selectors. The value of this selector is included in the Device XML file together with register information indicating a location where the value of the selector is stored. Therefore, before the captured image captured by the imaging device 3 is output to the outside, the plurality of selectors associated with the setting items for setting the multi-stage processing to be applied to the captured image and the register information indicating the location where the value of each selector is stored are included in the Device XML file.

(Multi-Stage Selector)

As illustrated in FIG. 8, the flowchart branches in the horizontal direction by the parameter set, and for example, the plurality of preprocessing modules can be added within each parameter set. Multiple stages of preprocessing (filter processing) can be set in one preprocessing module. A relationship between Features with which setting items of a setting user interface 50 are associated and an editing target unit that retains entities of parameters to be actually edited by the Features is specified through these selectors through multiple stages. In this embodiment, the functions of the selector can be broadly divided into three of the designation of the parameter set, the designation of the filter processing, and the designation of the multi-stage filter. However, these functions have a relationship in which the designation of the parameter set is positioned at a highest layer, the designation of the filter processing is positioned under the parameter set, and the designation of the multi-stage filter is positioned under the designation of the filter processing, and the relationship is not limited thereto. The selector for designating the filter processing indicates the inside of a different parameter set (flowchart) when the parameter set is switched. Furthermore, the setting of the actual filter set at multi-stages within the filter processing is specified by the designation of the multi-stage filter. In this manner, a unit that retains parameters with which Features are associated can be specified by combining values of the plurality of selectors. When the selector that designates the parameter set is switched, at least the setting target of the parameter is switched, but the switching of an execution target depends on the implementation.

Figure 12:
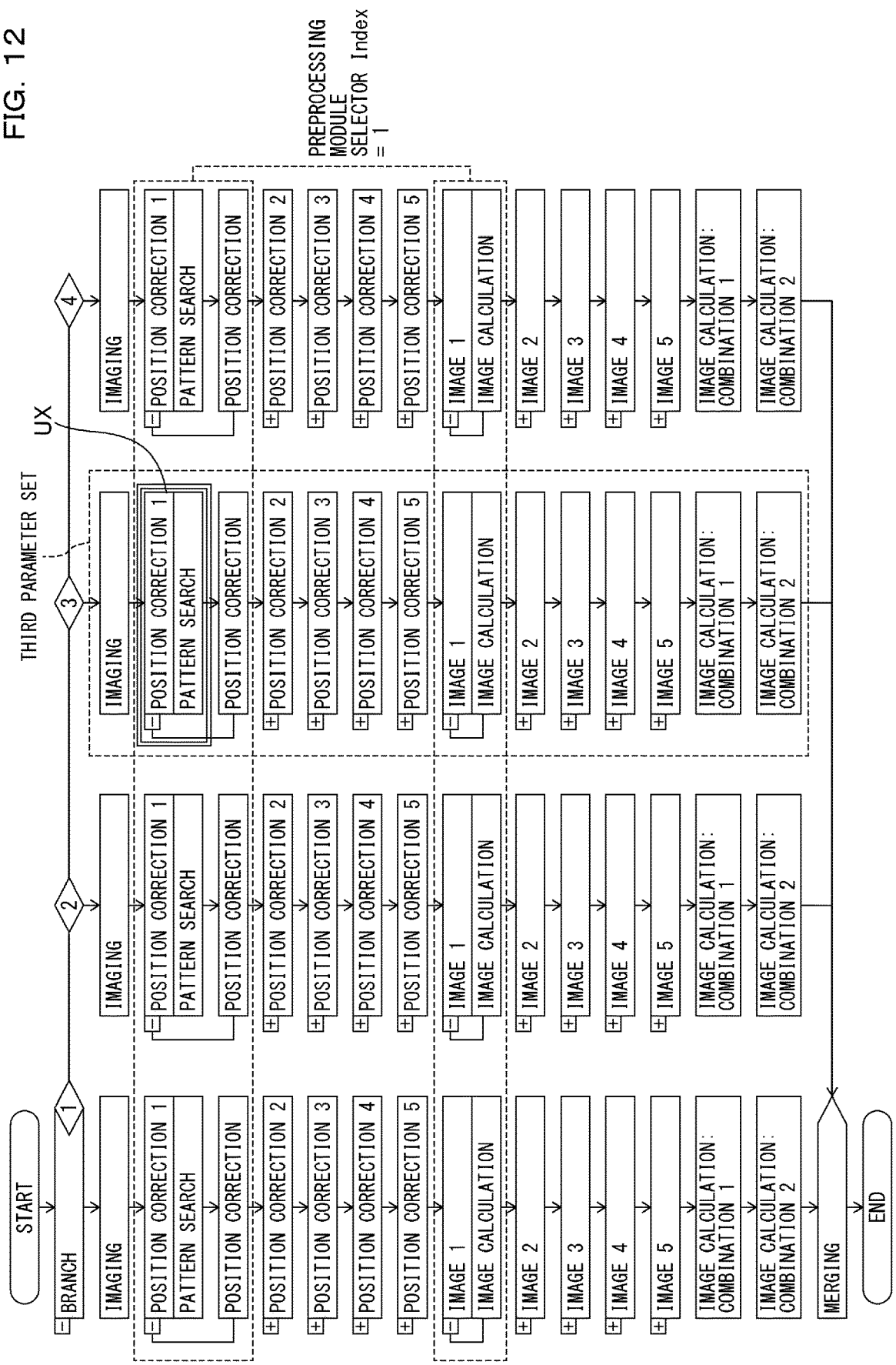
FIG. 12 is a diagram for describing a main point for specifying a unit in the flowchart of the internal processing of the imaging device.

For example, in a flowchart illustrated in FIG. 12, when a unit UX surrounded by a double line is specified, the unit UX can be specified by deciding two values of a value indicating that the selector of the highest parameter set is the parameter set number 3 and a value indicating that the selector index of the preprocessing module is 1. The units capable of being decided by the value of the selector are, for example, the pattern search unit, the position correction unit, and the image calculation unit (including the filter processing unit). The parameter retained by a target unit UX can be obtained by specifying the Feature belonging to any unit of the pattern search unit, the position correction unit, and image calculation unit from the image inspection application 40 side based on the name of the Feature to be accessed.

(Configuration of Setting Device 4)

The setting device 4 is a device that transmits data indicating the setting value of each setting item set by the user and the register information corresponding to each setting item included in the Device XML file 31c to the imaging device 3 and sets the imaging device 3.

Figure 13:
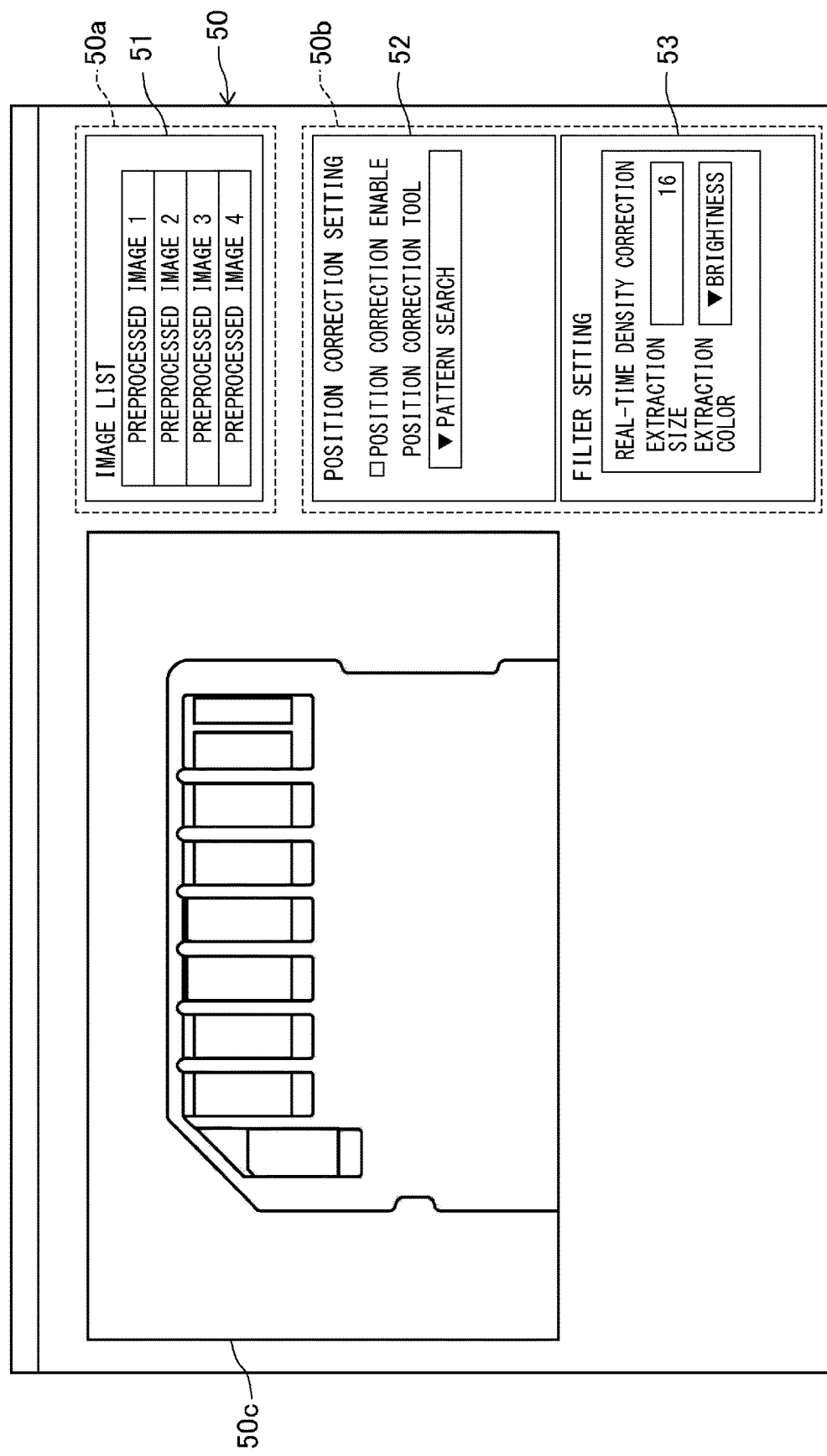
FIG. 13 is a diagram illustrating a setting user interface.

As illustrated in FIG. 7, the setting device 4 includes a UI generation unit 4a. The UI generation unit 4a is a part that generates various user interfaces, and is configured to generate, for example, the setting user interface 50 illustrated in FIG. 13. The various user interfaces generated by the UI generation unit 4a are displayed on the display unit 5.

The setting user interface 50 includes a first region 50a for switching between the editing targets, a second region 50b for displaying and changing the setting items, and an image display region 50c for displaying the images as the editing targets. An image switching operation region 51 for switching between the images as the editing targets is provided in the first region 50a. In the image switching operation region 51, identification information of the image captured by the imaging device 3 is displayed in a list format. The identification information of the image can include, for example, a name of the image and a number assigned to the image. In this example, the names of the four images are displayed so as to be arranged in the vertical direction, but the number and arrangement direction of images to be displayed can be arbitrarily set. The user can select an arbitrary name from the names of the images displayed in the image switching operation region 51 by operating the keyboard 6 and the mouse 7. When the name is selected, the UI generation unit 4a displays the image corresponding to the selected name in the image display region 50c. The image displayed in the image display region 50c can be changed.

A position correction setting region 52 for performing position correction setting as the setting item and a filter setting region 53 for performing filter processing setting as the setting item are provided in the second region 50b. In the position correction setting region 52, a portion for selecting whether or not to enable the position correction and a portion for selecting the classification of the position correction tool are assigned and displayed as Features corresponding to the position correction setting. Since the selection of the classification of the position correction tool can be initially set after the position correction is enabled, the selection of whether or not to enable the position correction and the selection of the classification of the position correction tool are in a dependency relationship.

In the filter setting region 53, the kind of the selected filter and a portion for selecting and adjusting the parameter related to the setting of the filter such as an extraction size and an extraction color are assigned and displayed as Features corresponding to the filter processing setting. Multiple kinds of filter processing may be performed on one image selected in the image switching operation region 51, and in this case, a plurality of filter setting regions 53 is provided, and Features corresponding to each filter processing setting are assigned and provided.

A setting task performed by the user will be described. When the user selects any one of the names of the images displayed in the image switching operation region 51, the image having the selected name is displayed in the image display region 50c. The display of the second region 50b is automatically switched for the parameters capable of being edited and set for generating the selected image. Internally, for example, when a certain preprocessed image is selected in the image switching operation region 51, the value of the selector that designates the setting target is switched to the value of the index corresponding to the preprocessing module used for generating the image. As a result, the setting content displayed in the second region 50b is switched according to the image. When the value of the selector that designates the setting target is designated, one or a plurality of Features of the preprocessing module pointed by the selector corresponding to the value is read, an image reflecting the setting item is generated, and the generated image is displayed in the image display region 50c. The values set for the parameters are displayed in the position correction setting region 52 and the filter setting region 53. When the user operates the operation portion displayed in the position correction setting region 52 or the filter setting region 53, the operation is accepted, and the setting item of the unit corresponding to the preprocessing module corresponding to the value of the selector that designates the setting target is changed.

The following method can be used as the method of specifying the unit to be accessed from the value of the selector. That is, the preprocessing module is constituted by a plurality of units. A selector common to these units can be used as the selector that switches between the indices of the preprocessing module, and the plurality of units constituting the preprocessing module can be named such that the unit to which the Feature belongs is uniquely decided by the name of the Feature. Accordingly, the unit to be accessed can be specified from the combination of the value of the selector and the Feature selected as the editing target.

Figure 14:
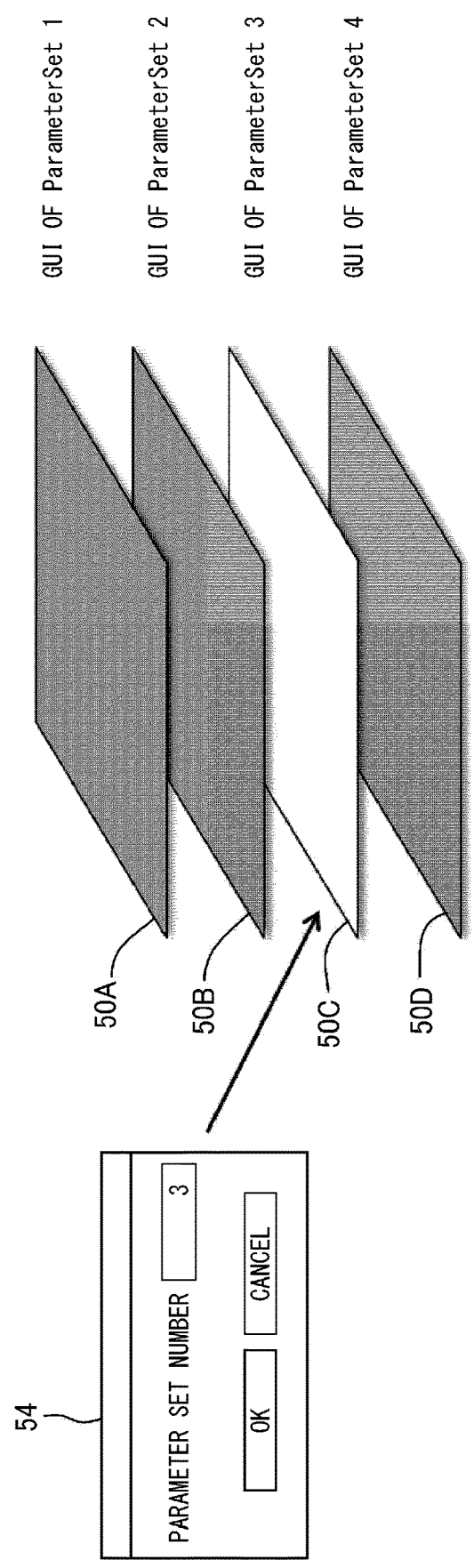
FIG. 14 is a schematic diagram illustrating a case where the setting user interface is switched by selecting a parameter set number.

FIG. 14 is a schematic a diagram illustrating a case where the second region 50b of the setting user interface 50 is switched by selecting the parameter set number, and the display of the user interface can be switched as illustrated in this diagram. For example, a parameter set number selection unit 54 as illustrated on a left side of FIG. 14 is provided on the user interface 50. As illustrated on a right side of FIG. 14, a user interface for setting a first parameter set 50A, a user interface for setting a second parameter set 50B, a user interface for setting a third parameter set 50C, and a user interface for setting a fourth parameter set 50D are present in association with the parameter numbers. When the parameter set number is switched by the parameter set number selection unit 54, the UI generation unit 4a reconstructs the setting user interface 50 according to the parameter set number. That is, when the user selects the parameter set number 3, the setting user interface 50C for the parameter set number 3 is generated and displayed on the display unit 5.

Figure 15:
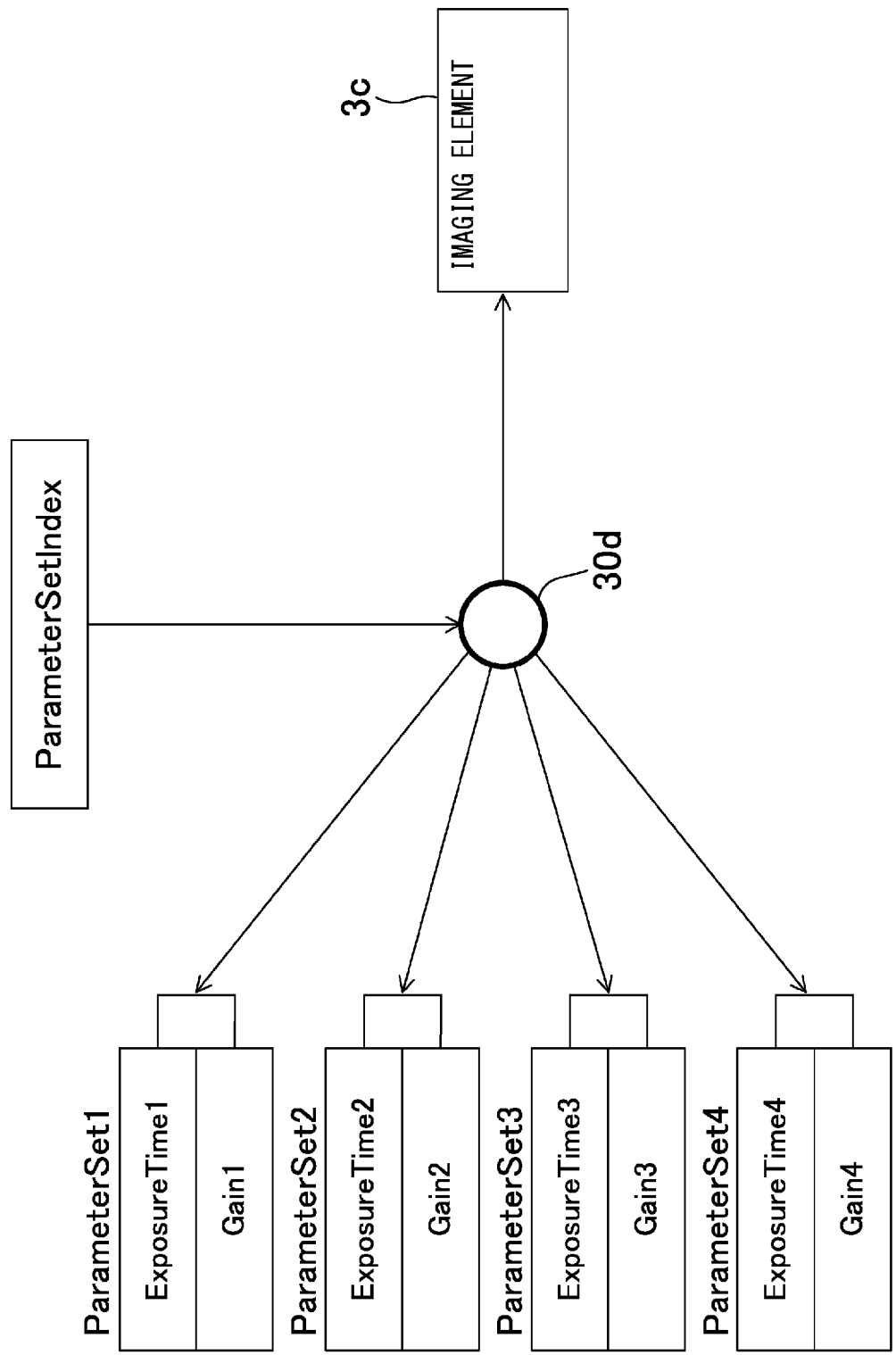
FIG. 15 is a diagram for describing an internal mechanism for switching the parameter set by selecting the parameter set number.

FIG. 15 is a diagram for conceptually describing an internal mechanism that switches between the parameter sets by selecting the parameter set number. The imaging device 3 includes a parameter set switching unit 30d that executes the switching between the parameter sets. A parameter set number (ParameterSetIndex) selected by the user is input to the parameter set switching unit 30d. The parameter set switching unit 30d selects the parameter set corresponding to the input parameter set number, and applies the selected parameter set to an image sensor 3c.

Therefore, the setting device 4 can display the setting user interface 50 on the display unit 5, and can accept various settings by the user on the setting user interface 50. When the user performs the setting so as to perform the multi-stage processing on the image captured by the imaging device 3, the setting device 4 specifies the combination of the values of the plurality of selectors for realizing the multi-stage processing set by the user as a multi-stage selector, and can transmit the values of the plurality of selectors and the register information indicating the locations where the plurality of selectors is stored, to the imaging device 3. The imaging device 3 receives the values of the plurality of selectors transmitted from the setting device 4 and the register information indicating the locations where the plurality of selectors are stored, stores the values of the plurality of selectors in the locations indicated by the corresponding register information, and sequentially executes the multi-stage processing specified by the combination of the values of the selectors.

When the user changes the setting value for the setting item of the imaging device 3, since the imaging device 3 can be set by transmitting the data indicating the setting value of each setting item set by the user and the register information corresponding to each setting item included in the Device XML file to the imaging device 3, the setting value can be changed from the setting device 4 side when the imaging device 3 is conformable to the standardization standard, and the degree of freedom of the selection of the model of the imaging device 3 is improved.

Since a part of the multi-stage processing sequentially executed can be uniquely specified by the combination of the values of the selectors, the imaging device 3 conformable to the standardization standard performs, for example, multi-stage processing such as the generation of the inspection image using the principle of the photometric stereo or the deflectometry, the multispectral imaging, and the filter processing of the generated inspection image.

(Virtual Flowchart and Virtual Unit)

Unlike the flowchart illustrated in FIG. 8, in an actual operating environment, there are no regularities that the setting target can be designated by simply combining the selectors with the units that appear in the horizontal direction or the vertical direction in many cases. In this state, whenever the unit configuration on the flowchart is changed, since the Device XML is regenerated within the camera 3 or the PC software side also needs to re-acquire the Device XML file, it is difficult to use the imaging device.

When the flowchart is supported by as few Feature expressions as possible by using a fixed Device XML file, it is desirable that this flowchart has a pattern decided to some extent in the vertical direction and is a form copied in the horizontal direction by the concept of the parameter set. For example, when the flowchart can be expanded in the vertical direction, that is, when the number of settable filter processing is increased, the entire flowchart is expanded in the vertical direction by the number of settable filter processing. When the number of available parameter sets is increased, the flowchart is expanded in the horizontal direction. However, in the actual operating environment, it is difficult to assume that the filter processing is used up to a settable upper limit for all the parameter sets, and especially when the settable upper limit is a large value, it is expected that most of the units will be set to "non-execution" like the unit UB4 illustrated in FIG. 10, for example.

Since the combinations of the values of the plurality of selectors for realizing the processing set by the user are present in the plurality of patterns, the setting device 4 can transmit the combination of the values of the selectors in the plurality of patterns to the imaging device 3. The imaging device 3 is configured to receive the combination of the values of the selectors in the plurality of patterns transmitted from the setting device 4, specify the processing executed by the combination of the values of the selectors in any one pattern selected by the user from the combinations of the values of the selectors in the plurality of patterns, and dynamically develop the setting parameter for executing the specified processing in the internal memory of the imaging device 3.

Within the image inspection application 40, an accessible unit is decided according to the combination of the selectors and the kind of the Feature, and the unit to which an internal memory region is actually allocated is automatically associated with the Feature. Accordingly, the user can access without being aware of the shape of the virtual flowchart actually generated within the image inspection application and the arrangement of the virtual unit.

(Position Correction and Filter Processing)

Among the pieces of filter processing, there is a filter exhibiting an effect that strongly depends on the directionality of the image. Specifically, there are a direction-specific filter and a difference filter that extract a portion at which a change in luminance value between adjacent pixels in a predetermined direction of the image is equal to or greater than a predetermined threshold value. The direction-specific filter is a filter capable of selecting the predetermined direction from the X direction and the Y direction.

Figure 16:
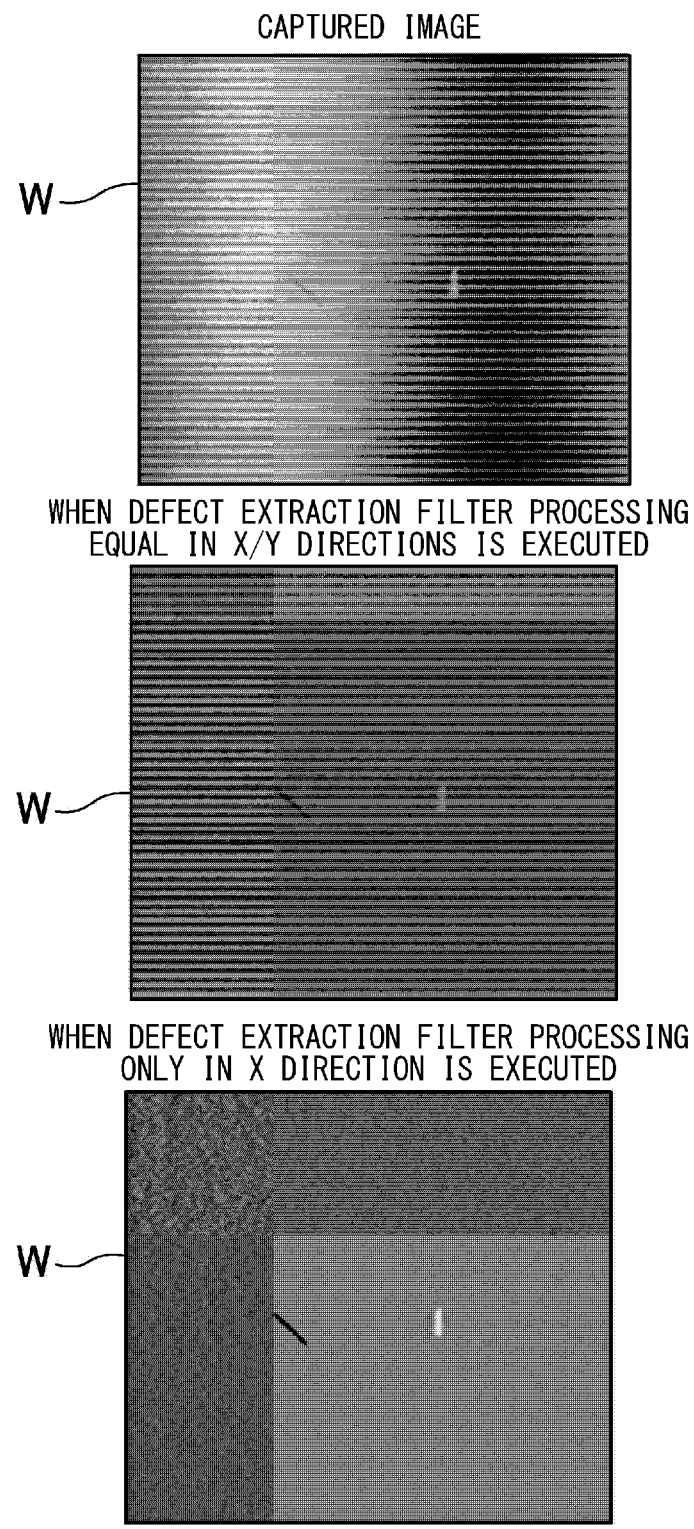
FIG. 16 is a diagram illustrating a processing example of a direction-specific filter.

As illustrated in FIG. 16, when the captured image of the workpiece W is an image in which white and black defective portions are reflected on a striped background in the Y direction and defect extraction filter processing equal in the X direction and the Y direction is performed on the captured image, since a defect extraction filter is a filter that extracts a portion where the change between the adjacent pixels is large, the change in the Y direction is also inspected and the defective portion is not noticeable by the striped background. Meanwhile, when the filter processing is executed so as to catch only the change in the X direction, the stripe pattern of the background disappears, and only the defective portion can be extracted. As a result, the presence of the defective portion can be easily understood.

In this manner, the defect of the workpiece W can be inspected. The defect inspection method is not limited to the aforementioned method, and other defect inspection methods may be used. The defect inspection may be performed by the imaging device 3 or may be performed by the setting device 4. When the defect inspection is performed by the imaging device 3, the inspection result can be output from the imaging device 3 to the setting device 4, and can be displayed on the display unit 5. When the defect inspection is performed by the setting device 4, the inspection image generated by the imaging device 3 can be output to the setting device 4, and the defect inspection can be performed by the setting device 4. Further, the image captured by the imaging device 3 can be output to the setting device 4, and the setting device 4 can generate the inspection image and can perform the defect inspection.

The filter exhibiting an effect that strongly depends on the directionality of the image cannot obtain an appropriate processing result when the angle of the workpiece W to be captured is changed. Thus, before the filter processing is executed, the imaging device 3 measures the position and the angle of the workpiece W by the pattern search unit, and the imaging device 3 performs the position correction by the position correction unit. Accordingly, it is possible to correct the image on which the workpiece W faces a specific direction. This is the position correction function. The plurality of kinds of tools to be used as the search units can be set such that tools appropriate for the detection of the workpiece W can be selected. The search by the search unit is a search setting for performing the position correction of the workpiece W in the captured image, and this setting item is included in the Device XML file.

Figure 17:
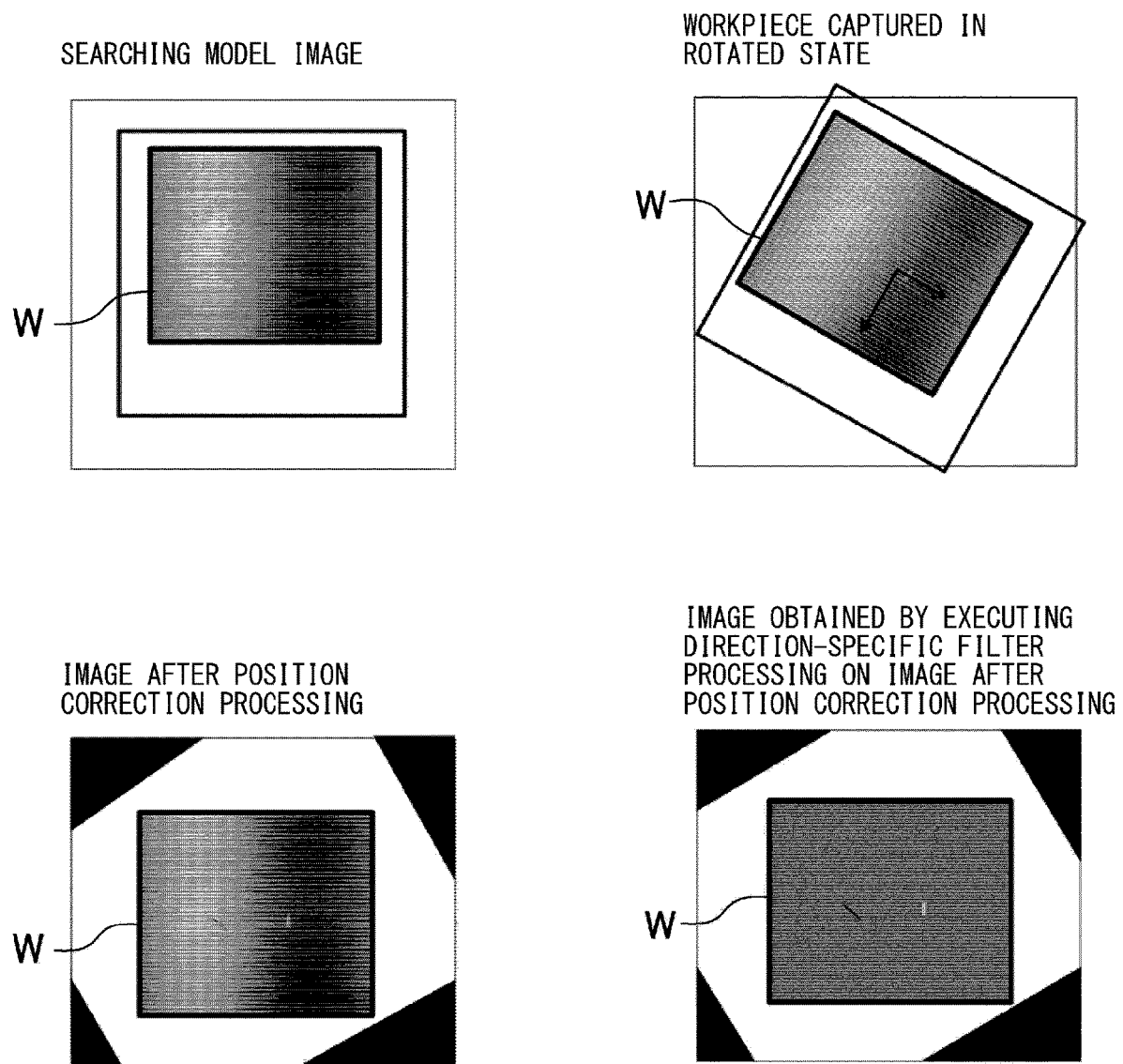
FIG. 17 is a diagram for describing a case where the direction-specific filter is executed after position correction.

After the position correction is performed by the position correction function, the filter processing exhibiting the effect that strongly depends on the directionality of the image is executed, and thus, the influence of the angle around the optical axis at the time of capturing an image of the workpiece W is eliminated. Accordingly, an appropriate processing result can be obtained. As illustrated in FIG. 17, when the searching model image is specified and is stored in the imaging device 3 at the time of setting the image inspection system 1 and image of the workpiece W is captured in a state in which the workpiece is rotated around the optical axis of the imaging device 3 at the time of operating the image inspection system 1, the position correction processing is performed such that the workpiece W faces the specific direction based on the searching model image. Accordingly, a region in which the workpiece W is reflected is rotated such that the workpiece W faces the specific direction. The direction-specific filter processing is executed on the image after the position correction processing is performed.

FIG. 18 illustrates a filter setting user interface 55. The filter setting user interface 55 is generated by the UI generation unit 4a of the setting device 4 illustrated in FIG. 7, and is displayed on the display unit 5 illustrated in FIG. 1 and the like. The filter setting user interface 55 includes an image selection unit 55a for selecting an image on which the filter processing is to be executed, a color extraction setting unit 55b for performing an extraction setting of a color, a filter setting unit 55c for performing a filter setting, a region setting unit 55d that is used when a predetermined region of the image is cut and a filtered image is generated, and a position correction setting unit 55e for performing the position correction setting (search setting).

FIG. 19 is a diagram illustrating images on which the filter processing is to be executed in a list form, and the images on which the filter processing can be executed are different depending on the classification or the method of generating the inspection image. The image selection unit 55a illustrated in FIG. 18 can select any one of the plurality of images illustrated in FIG. 19. The images illustrated in FIG. 19 are examples, and the present invention is not limited to these images.

FIG. 20 illustrates a detailed user interface 56 for specifically performing the filter setting, and the detailed user interface is generated by the UI generation unit 4a of the setting device 4 illustrated in FIG. 7, and is displayed on the display unit 5 illustrated in FIG. 1. For example, when an "add" button of the filter setting unit 55c illustrated in FIG. 18 is pressed, the detailed user interface 56 illustrated in FIG. 20 can be displayed. The detailed user interface 56 includes a selection unit 56a that selects the filter classification to be executed, and a parameter change unit 56b that changes various parameters of the filter selected by the selection unit 56a.

FIG. 21 is a diagram illustrating the classification of the filter and the direction dependency of each filter. In the selection unit 56a illustrated in FIG. 18, any one or a plurality of filters can be selected from the plurality of filters illustrated in FIG. 21. Examples of the filter having direction dependency include a dilation filter (X/Y direction), an erosion filter (X/Y direction), an edge extraction filter, a real-time gradation correction filter (X/Y direction), and a blurring processing filter (X/Y direction), and a line defect extraction filter (angle). These filter processing are filter settings exhibiting the effect of the direction dependency of each filter by correcting the image in advance using the result of position correction, and are setting items included in the Device XML file.

Figure 22:
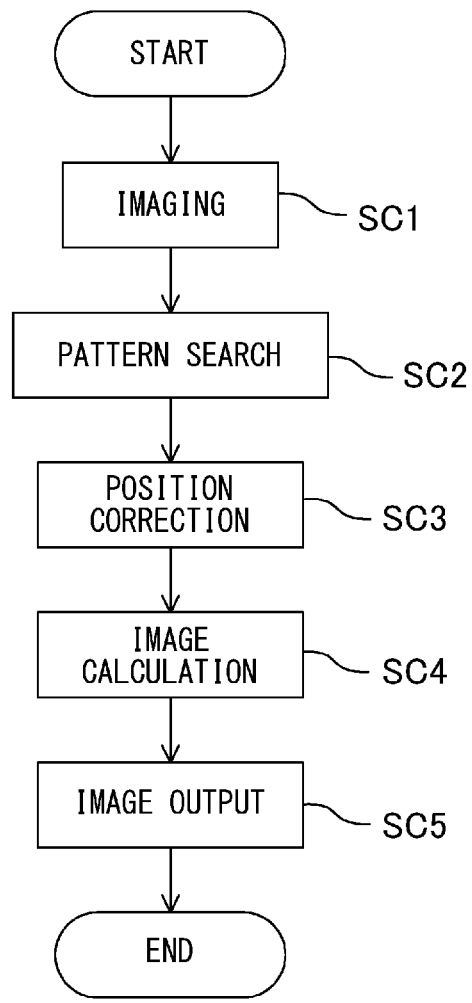
FIG. 22 is a flowchart for executing the direction-specific filter after position correction.

FIG. 22 illustrates a flowchart for executing the direction-specific filter after the position correction is performed. The imaging is performed in step SC1 after the start. Thereafter, in step SC2, the pattern search is performed on the image captured in step SC1, and then in step SC3, the position correction is performed such that the workpiece W faces the specific direction. In step SC4, the image calculation is performed. The direction-specific filter processing is performed as part of the processing. Thereafter, the processing proceeds to step SC5, and the generated image is output to the setting device 4.

Figure 23:
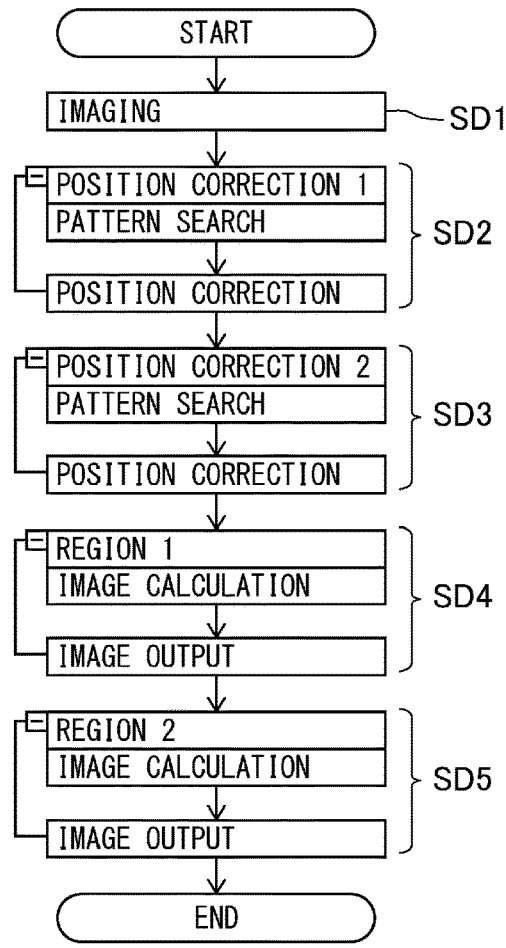
FIG. 23 is a flowchart for executing the direction-specific filter after position correction when a plurality of regions is set.

FIG. 23 illustrates a flowchart for executing the direction-specific filter after the position correction is performed when a plurality of regions (region 1 and region 2) is set in one image in the region setting unit 55d of the filter setting user interface 55 illustrated in FIG. 18. For example, when the imaging is performed in step SD1 after the start, the position correction is performed for the region 1 after the pattern search is performed in step SD2, and the position correction is performed for the region 2 after the pattern search is performed in step SD3. Thereafter, the generated image is output after the image calculation is performed for the region 1 in step SD4, and the generated image is output after the image calculation is performed for the region 2 in step SD5.

That is, the setting device 4 is configured to display the filter setting user interface 55 and the detailed user interface 56 and transmit the setting content for realizing the search setting and the filter setting set by the user on the user interfaces 55 and 56 and the register information indicating the location where the setting content is stored, to the imaging device 3. When the setting content and the register information transmitted from the setting device 4 are received, the imaging device 3 is configured to store the setting content in the location indicated by the corresponding register information, perform the position correction of the workpiece W based on the search setting on the captured image, and execute the filter processing based on the result of the position correction by the search setting. Accordingly, the effect of the filter processing depending on the position at the time of capturing an image of the workpiece W can be sufficiently obtained.

(Moving object tracking)

When the inspection image is generated based on the principle of the photometric stereo or multi-spectrum, the plurality of pieces of imaging processing is executed by using the single trigger signal, and the plurality of obtained images is combined. In this case, when the workpiece W is moving between the plurality of pieces of imaging processing, since the combination processing after the imaging is performed cannot be correctly performed, it is necessary to detect a shift amount for each image. The search for detecting the shift amount can be performed by the search unit, and the combination processing of the plurality of images is executed after the shift amount is corrected based on the detected shift amount.

The combination processing can be performed by the image calculation unit. A combination setting for combining the plurality of captured images is included as the setting item in the Device XML file. Therefore, the combination setting for combining the plurality of captured images is included as the setting item related to processing to be applied to the captured images in the Device XML file before the captured image captured by the imaging device 3 is output to the outside.

Figure 24:
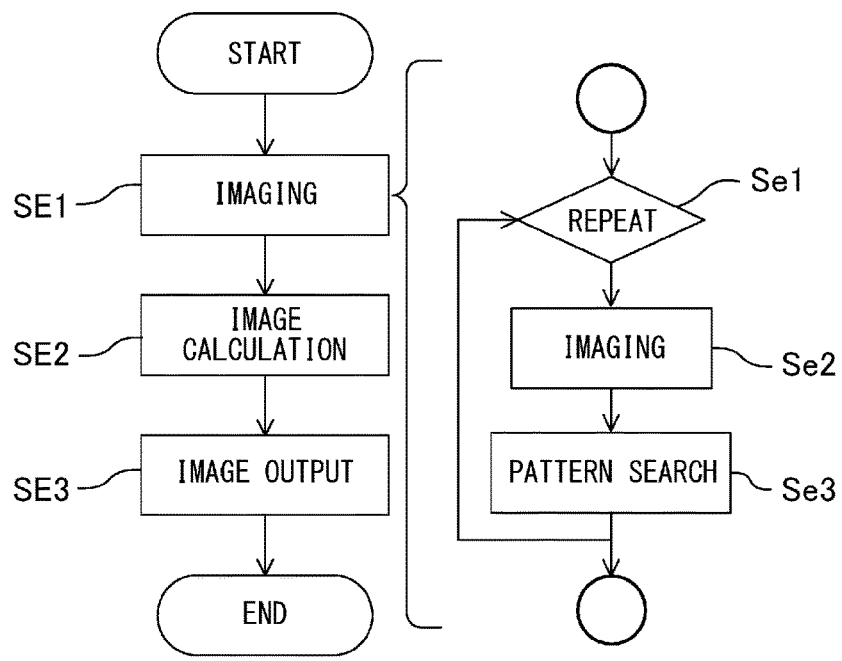
FIG. 24 is a flowchart at the time of moving object tracking.

FIG. 24 is a flowchart when moving body tracking is performed. In an imaging step of step SE1, the imaging processing is performed multiple times and the pattern search is performed on each image by executing a private flowchart. Thereafter, the combination processing is performed in consideration of the shift amounts of the plurality of images in step SE2. In step SE3, the combined image is output. As shown in the flowchart shown on the right, the capturing an image may be performed in step Se2 after step Se1, the pattern search may be performed in step Se3. These steps may be repeated a predetermined number of times.

The setting device 4 is configured to display the user interface for performing the combination setting by the user on the display unit 5 and transmit the setting content for realizing the combination setting set by the user on the user interface and the register information indicating the location where the setting content is stored to the imaging device 3. The imaging device 3 is configured to receive the setting content and the register information transmitted from the setting device 4, store the setting content in the location indicated by the corresponding register information, and execute the combination processing for combining the plurality of captured images.

(Ledger Output)

A ledger is a text format output of the setting content of the imaging device 3 corresponding to the GenICam standard. The setting items are represented by combinations of setting names and setting values, and these setting items are listed in a list form. In the present embodiment, the image inspection application 40 operates on the setting device 4, and the setting device 4 and the imaging device 3 are connected according to the standardization standard as described above. Therefore, the set content is read from the imaging device 3 to the setting device 4 side, and the read content is output from the setting device 4 in a text form and is managed and stored on the setting device 4 side. It is necessary to write back from the setting device 4 side to the imaging device 3 side if necessary.

However, when the inspection image is generated based on the principle of the photometric stereo and the deflectometry or when the inspection image is generated by the multispectral imaging, the number of setting items is increased, and orderliness is required. Therefore, the setting items can be complicated. In the present embodiment, a function for simply outputting a structure of the complicated setting items as the ledger is installed. This is a function realized by a ledger output unit 4b illustrated in FIG. 7.

When the ledger is output, there is a method in which register values are simply written in ascending order of register addresses. However, in order to correctly restore the setting content, it is necessary to set each register according to a setting order between the registers. Thus, it is preferable that the ledger is written in advance in a correct setting order.

The setting order includes the following (1) and (2).

(1) When Another Register can be Set by Enabling Certain Register

For example, a setting item of a frame rate is an example of the register defined in the GenICam standard. When the user wants to set an arbitrary frame rate, it is necessary to initially control the register for enabling the frame rate to be set. When the frame rate cannot be set, the imaging device 3 operates at an internally decided frame rate. That is, the register of the setting item of the frame rate can be set by enabling the register that can set the frame rate. Therefore, it is necessary to initially write the setting of the register that enables the frame rate to be set, and then write the register of the setting item of the frame rate.

When the shape image is generated based on the principle of the deflectometry, the feature size of the shape image can be set by enabling the generation of the shape image. Therefore, it is necessary to initially write the register setting for enabling the generation of the shape image, and then write the feature size setting register of the shape image.

(2) When Register of Selector is Rewritten, Entity Pointed by Another register is switched In the present embodiment, a register (selector register) that means an array index is separately introduced in order to reduce the register consumption of an array type parameter. This is because when there is the selector register, only one register of a parameter body needs to be defined. For example, the relationship (2) is established between a terminal selector that selects a terminal and a selector that sets whether or not to invert a signal of the selected terminal. The relationship (2) is established between a selector of a white balance setting that can obtain any one value of red, green, and blue and a white balance setting value of the selected color. Therefore, it is necessary to set the register of the parameter body after the selector register is set.

That is, there is a plurality of setting items having a dependency relationship in which the validity or value of the other setting item is changed depending on the setting of one setting item. In the present embodiment, an appearance order of the registers in the Device XML file is decided in advance such that there is no reverse dependency relationship on the setting order in consideration of the order illustrated in the above (1) and (2). It is possible to output the structure of the complicated setting items in the form of the ledger in a correct setting order by writing the ledger in the order.

FIG. 25 illustrates an example of the ledger in which registers having two dependency relationships of a dependency relationship 1 and a dependency relationship 2 are described. Each register is defined in such a manner that the registers are grouped into a group called "Category". It is also possible to group categories into a group according to a higher category. A relationship between each category and each register has a tree structure as illustrated in FIG. 25.

Since the categories are formed by classifying the plurality of setting items having the dependency relationship in which the validity or value of the other setting item is changed depending on the setting of one setting item according to a degree of relevance, the structure can be easily understood. A plurality of categories is provided in one ledger.

The classification of the registers by the categories is useful when the register corresponding to the content that the user wants to set is searched for from a list. Therefore, when the structure of the categories is ignored and the appearance order of the registers are aligned in the correct order only from the viewpoint of the dependency relationship, the structure of the categories is destroyed, and the convenience of the user is remarkably impaired. Therefore, the ledger output unit 4b aligns the registers such that the appearance order is correct while maintaining the classification structure by the categories.

Specifically, sibling nodes are rearranged from an end of the tree in the correct appearance order. Thereafter, the sibling nodes on a first hierarchy on the tree are rearranged in the correct appearance order. This is repeated recursively towards a root of the tree. At this time, the appearance order of the registers means that the dependency relationship between the registers is constantly in a direction from the rear to the front. The appearance order of the categories means that the categories are rearranged such that a category 2 initially appears and then a category 1 appears when there is a dependency relationship from registers within the category 1 to registers within a category 2.

When the categories are rearranged in each hierarchy of the tree, a topological sort in which the dependency relationship between the registers and the categories is regarded as a directed side is performed. The topological sort itself is a well-known method, and the nodes are arranged such that any node is positioned before a node ahead of an output side in the ordering of the nodes.

Figure 27:
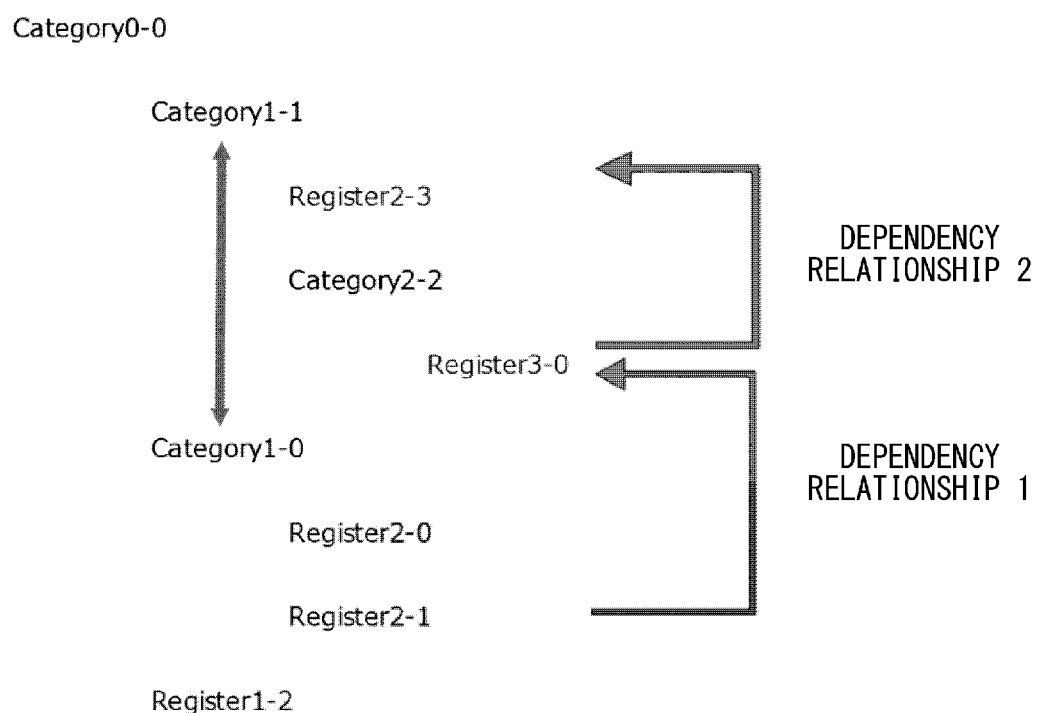
FIG. 27 is a diagram corresponding to FIG. 25 illustrating a state in which orders of a category and a register in one hierarchy are replaced.

Next, a specific example of a rearrangement procedure will be described with reference to FIGS. 26 and 27. In this example, the categories and the setting items have a hierarchical dependency relationship.

Procedure 1: orders of a category 2-2 and a register 2-3 at the endmost are replaced. Accordingly, the dependency relationship 2 from a register 3-0 to the register 2-3 correctly faces from the rear to the front as illustrated in FIG. 26.

Procedure 2: orders of a category 1-0 and a register 1-1 on the first hierarchy are replaced. Accordingly, the dependency relationship 1 from a register 2-1 to the register 3-0 is correctly directed from the rear to the front as illustrated in FIG. 27. When there is the higher hierarchy, the order may be changed in the same manner.

FIG. 28 is a diagram illustrating the appearance orders of the registers before and after the rearrangement is performed and the output ledger.

LtrxSh1ImageEnable is a register that sets whether or not to generate the shape image based on the principle of the photometric stereo. LineInverter is a register that sets whether or not to invert an output signal of the selected terminal. LineSelecter is a register that selects the terminal. LtrxSh1FeatureSize is a feature size setting register of the shape image. In the appearance order of the registers before the rearrangement is performed, LineInverter appears before LineSelecter, and the appearance order is different from the setting order. Thus, the registers are rearranged such that the order of the registers is the setting order, and then are output as in the form of the ledger. As illustrated as the "output ledger", output processing is looped by the number of indices of the selectors at the selector location.

For example, a register definition order can be automatically rearranged by the ledger output unit 4b of the setting device 4. The ledger may be rearranged at a timing when the ledger is output. Alternatively, the Device XML file rearranged may be retained in a controller in advance, and the Device XML file may be returned with no change when the setting device is connected from the PC side. A timing when the register definition order is rearranged is not particularly limited.

FIG. 29 illustrates a register structure for setting an imaging mode of the photometric stereo. In the mode of the photometric stereo is a mode in which the plurality of images is captured while switching between turning-on directions of the illumination by the illumination device 2 and the inspection image that emphasizes the scratches and irregularities on the surface of the workpiece W by combining the plurality of image data. The mode of the photometric stereo also has a function of tracking the moving body described above. When the moving body tracking is enabled, the images can be correctly combined even while the workpiece W is moving by additionally capturing an image for calculating the movement amount of the workpiece W. For example, the image for calculating the movement amount of the workpiece W can be an image at a point of time when the imaging of the first image is started and an image at a point of time when the last image is captured.

In the mode of the photometric stereo, it is necessary to obey the setting order between the registers such as a case where it is necessary to select whether or not to output the image to the setting device 4 on the assumption that a certain image is captured first. That is, as illustrated by arrows in FIG. 30, there is a dependency relationship from the register for whether or not to output the image to the register for whether or not to capture the image from the front to the rear. In this example, an anteroposterior relationship of the registers is not in the setting order (input order). Therefore, when there is an attempt to input the ledger output in this order, an error occurs during the input, and the setting cannot be completed.

Figure 31:
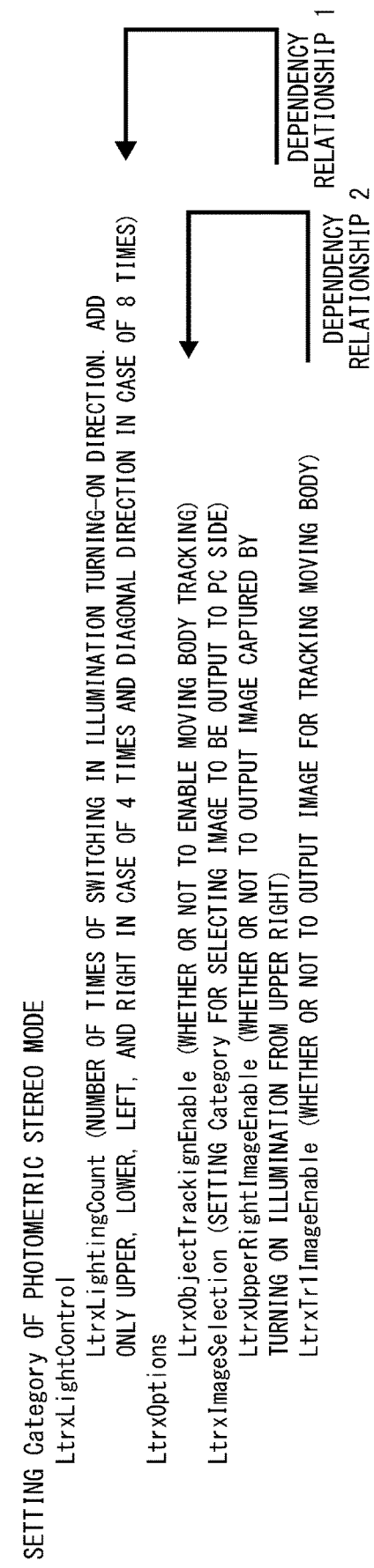
FIG. 31 is a diagram corresponding to FIG. 29 when the rearrangement of the registers is performed.

In the present embodiment, the rearrangement of the registers can be automatically performed by the aforementioned procedure. FIG. 31 illustrates a state in which the plurality of registers illustrated in FIG. 30 is rearranged. Since this definition order is the order (setting order) to be set by the user, an error does not occur at the time of inputting the setting items the output ledger.

Accordingly, the setting device 4 is configured to output the ledger in which the setting items are described according to the setting order based on the dependency relationship between the plurality of categories formed by classifying the plurality of setting items having the dependency relationship in which the validity or value of the other setting item is changed depending on the setting of one setting item according to the degree of relevance and between the setting items. Accordingly, since the setting items are described in the ledger according to the setting order based on the dependency relationship between the plurality of categories and between the setting items, the ledger is simplified, and the setting content is difficult to be erroneously restored.

Advantageous Effects of Embodiment

According to this embodiment, as described above, since the plurality of captured images can be combined by the imaging device 3 conformable to the standardization standard, it is possible to perform the generation of the inspection image using the principle of the photometric stereo or the deflectometry and the multispectral imaging, for example.

It is possible to achieve both improvement of a degree of freedom in selecting the model of the imaging device 3 and improvement in accuracy of the image inspection by causing the imaging device 3 conformable to the standardization standard to perform the multi-stage processing in order.

Since the setting parameter for executing the specified processing is dynamically developed in the internal memory of the imaging device 3, the memory usage of the imaging device 3 can be suppressed while realizing flexible function expansion for the imaging device 3 conformable to the standardization standard.

Since it is possible to perform the filter processing based on the result of the position correction after the position correction of the workpiece W in the captured image is performed, the effect of the filter processing depending on the position and orientation at the time of capturing an image of the workpiece W is sufficiently obtained.

The plurality of categories can be formed by classifying the plurality of setting items having the dependency relationship, and the ledger in which the setting items are described according to the setting order can be output based on the dependency relationship between the plurality of categories and between the setting items. Accordingly, it is possible to simply output the ledger to be exchanged between the imaging device 3 and the setting device 4 conformable to the standardization standard. It is possible to facilitate the implementation, and the setting contents cannot be erroneously restored.

The aforementioned embodiment is merely an example in all respects, and should not be interpreted in a limited manner. All modifications and changes belonging to the equivalent scope of the claims are within the scope of the present invention.

As described above, the present invention can be used when the inspection object such as the workpiece is inspected.

What is claimed is:

1. An image inspection system that includes an imaging device for an image inspection device which captures an image of an inspection object, and a setting device which is connected to the imaging device via a network, acquires an XML file, wherein the XML file stores a plurality of setting items of the imaging device as features, wherein the features are in association with register information comprising a register address indicating a location where a setting value of each feature is stored and texts for specifying each of the features, transmits data indicating the setting value of each feature set by a user and the register information corresponding to each feature included in the XML file, to the imaging device, and sets the imaging device, wherein the features comprising a common feature and a specific feature are included as the plurality of setting items in the XML file, the common feature comprises an exposure time setting to set an exposure time of the imaging device;

the specific feature comprises a combination setting for combining a plurality of captured images and is related to processing to be applied to a captured image, before the captured image captured by the imaging device is outputted, the setting device is configured to display a user interface, and transmit a setting content for realizing the exposure time setting and the combination setting set by the user on the user interface, and register information indicating a location where the setting content is stored, to the imaging device, and the imaging device is configured to store the setting content in the location indicated by the corresponding register information, set exposure time, and execute combination processing for combining the plurality of captured images.

2. The image inspection system according to claim 1, wherein the imaging device is configured to output an image on which the combination processing is executed.

3. The image inspection system according to claim 1, wherein a search setting for performing position correction of the inspection object in the captured image is included, as one of the plurality of setting items related to the processing to be applied to the captured image, in the XML file, and the combination setting included in the XML file is a setting for combining the plurality of captured images based on a result of the position correction using the search setting, the setting device is configured to transmit a setting content for realizing the exposure time setting, the search setting, and the combination setting set by the user on the user interface and register information indicating a location where the setting content is stored, to the imaging device, and the imaging device is configured to perform the position correction of the inspection object based on the search setting on the captured image, and execute the combination processing based on a result of the position correction using the search setting.

4. The image inspection system according to claim 1, wherein the imaging device is configured to acquire a plurality of luminance images having different illumination directions, and the combination processing is processing for generating a shape image by combining the plurality of luminance images based on a principle of photometric stereo.

5. The image inspection system according to claim 1, wherein the imaging device is configured to acquire a plurality of luminance images by sequentially applying a plurality of pattern light rays having different phases of illuminance distributions and performing imaging of the inspection object at a timing when the pattern light rays are applied, and the combination processing is processing for generating a shape image by combining the plurality of luminance images based on a principle of deflectometry.

6. The image inspection system according to claim 1, wherein the imaging device is configured to acquire a plurality of luminance images by sequentially applying light rays having different wavelengths and performing imaging of the inspection object at a timing when the light rays are applied, and the combination processing is processing for generating a shape image by combining the plurality of luminance images by multispectral imaging.

7. The image inspection system according to claim 3, wherein the imaging device is configured to acquire the plurality of captured images by performing imaging of the inspection object being transported multiple number of times and perform the position correction of the inspection object based on the search setting on the plurality of acquired captured images.

8. An image inspection method of inspecting an inspection object by preparing an imaging device for an image inspection device which captures an image of the inspection object, and a setting device which is connected to the imaging device via a network, acquires an XML file, wherein the XML file stores a plurality of setting items of the imaging device, wherein the plurality of setting items are in association with register information comprising a register address indicating a location where a setting value of each setting item is stored and texts for specifying each of the plurality of setting items, transmits data indicating the setting value of each setting item set by a user and the register information corresponding to each setting item included in the XML file, to the imaging device, and sets the imaging device, the method comprising:

adding features comprising a common feature and a specific feature included as the plurality of setting items to the XML file, wherein the common feature comprises an exposure time setting to set an exposure time of the imaging device, and the specific feature comprises a combination setting for combining a plurality of captured images and is related to processing to be applied to a captured image before the captured image captured by the imaging device is outputted;

by the setting device, displaying a user interface, and transmitting a setting content for realizing the exposure time setting and the combination setting set by a user on the user interface, and register information indicating a location where the setting content is stored, to the imaging device; and by the imaging device, storing the setting content in the location indicated by the corresponding register information, setting exposure time, and executing combination processing for combining the plurality of captured images.

* * * * *